(12) United States Patent
Zou et al.

(10) Patent No.: US 9,639,066 B2
(45) Date of Patent: May 2, 2017

(54) DISPLAY DEVICE AND ELECTRONIC APPARATUS

(71) Applicant: Lenovo (Beijing) Co., Ltd., Beijing (CN)

(72) Inventors: Chenggang Zou, Beijing (CN); Xiaopan Zheng, Beijing (CN); Feijun Weng, Beijing (CN); Fei Wu, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 312 days.

(21) Appl. No.: 14/583,490

(22) Filed: Dec. 26, 2014

(65) Prior Publication Data
US 2015/0323788 A1    Nov. 12, 2015

(30) Foreign Application Priority Data

May 6, 2014    (CN) .......................... 2014 1 0188455

(51) Int. Cl.
*G06F 3/048*    (2013.01)
*G04G 17/04*    (2006.01)
(Continued)

(52) U.S. Cl.
CPC ......... *G04G 17/045* (2013.01); *G02B 17/086* (2013.01); *G02B 27/0101* (2013.01);
(Continued)

(58) Field of Classification Search
CPC ..................................................... G02B 27/30
(Continued)

(56) References Cited

U.S. PATENT DOCUMENTS 6,127,990 A    10/2000    Zwern
6,563,612 B1 *    5/2003    Aye ..................... G02B 5/0252
359/15

(Continued)

FOREIGN PATENT DOCUMENTS

CN    203433196 U    2/2014
CN    203811898 U    9/2014
CN    204302577 U    4/2015

OTHER PUBLICATIONS

First Office Action dated Mar. 3, 2017 (24 pages including English translation) out of Chinese priority Application No. 201410188455.0.

*Primary Examiner* — William Titcomb
(74) *Attorney, Agent, or Firm* — Brinks Gilson & Lione; G. Peter Nichols

(57) ABSTRACT

A display device and an electronic apparatus using the display device include a display component configured to output initial light corresponding to a first image; and a light path converting component configured to receive the initial light corresponding to the first image from the display component and to perform light path conversion on the initial light corresponding to the first image to form a virtual image corresponding to the first image, wherein the virtual image corresponding to the first image is perceived at a particular position and a size of the virtual image perceived being greater than a display size of the display component, wherein the light path converting component comprises a visible area, the particular position and the display component are located separately at two sides of a plane on which the visible area is located.

17 Claims, 29 Drawing Sheets

(51) Int. Cl.
 *G02B 17/08* (2006.01)
 *G02B 27/01* (2006.01)
 *G02B 27/30* (2006.01)
 *G02B 27/28* (2006.01)
(52) U.S. Cl.
 CPC ........... *G02B 27/017* (2013.01); *G02B 27/30* (2013.01); *G02B 27/283* (2013.01); *G02B 2027/014* (2013.01); *G02B 2027/0194* (2013.01)
(58) Field of Classification Search
 USPC ......................................................... 715/800
 See application file for complete search history.

(56) References Cited

U.S. PATENT DOCUMENTS

| | | | | |
|---|---|---|---|---|
| 6,717,745 B2* | 4/2004 | Nemes | ................... | G02B 27/09 359/670 |
| 7,800,765 B2* | 9/2010 | Minami | ............. | G02B 27/0068 356/614 |
| 8,203,710 B1* | 6/2012 | Mitchell | ................ | G01J 3/0208 356/328 |
| 9,316,832 B2* | 4/2016 | Levin | ................. | G02B 27/0172 |
| 9,316,835 B2* | 4/2016 | Wu | .................... | G02B 27/0176 |
| 9,316,837 B2* | 4/2016 | Harris | ................. | G02B 27/028 |
| 2010/0202048 A1* | 8/2010 | Amitai | ............... | G02B 27/0101 359/485.02 |
| 2012/0120498 A1* | 5/2012 | Harrison | .................. | G02B 3/08 359/630 |
| 2014/0347737 A1* | 11/2014 | Lvovskiy | ................ | G02B 27/30 359/641 |
| 2015/0138235 A1* | 5/2015 | Cho | ......................... | G02B 5/10 345/633 |
| 2015/0293358 A1* | 10/2015 | de Matos Pereira Vieira | ................ | G02B 27/0172 359/13 |
| 2015/0301339 A1* | 10/2015 | Harris | ................... | G06F 1/1601 345/648 |
| 2015/0316780 A1* | 11/2015 | Zheng | ................. | G02B 27/283 353/20 |
| 2016/0238843 A1* | 8/2016 | Dobschal | ........... | G02B 27/0172 |

* cited by examiner

DISPLAY DEVICE AND ELECTRONIC APPARATUS

This application claims priority to Chinese patent application No. 201410188455.0 filed on May 6, 2014, the entire contents of which are incorporated herein by reference.

The present application relates to the field of display device, and more particularly, to a display device and an electronic apparatus using the display device.

BACKGROUND

At present, an electronic apparatus is often equipped with a display, such as liquid crystal display (LCD), organic electroluminescent display, organic light emitting diode (OLED) display etc. There are some electronic apparatuses with limited size, such as a wearable electronic apparatus like a smart watch, smart glasses or an HMD (head-mounted display) device. For these size limited electronic apparatuses, display areas of their displays are usually quite small, therefore less information can be displayed.

SUMMARY

According to an embodiment of the present application, there is provided a display device, comprising a display component configured to output initial light corresponding to a first image; and a light path converting component configured to receive the initial light corresponding to the first image from the display component, and perform light path conversion on the initial light corresponding to the first image to form a virtual image corresponding to the first image, wherein the virtual image corresponding to the first image is perceived at a particular position, and a size of the virtual image perceived being greater than a display size of the display component, wherein the light path converting component includes a visible area, the particular position and the display component are located separately at two sides of a plane on which the visible area is located.

According to another embodiment of the present application, there is provided an electronic apparatus, comprising: a body device that includes a processing unit configured to generate a first image to be displayed and execute display control; a fixing device connected with the body device and configured to fix a position relationship relative to a user of the electronic apparatus; and a display device provided within the body device and/or the fixing device, wherein the display device includes: a display component configured to output initial light corresponding to the first image; and a light path converting component configured to receive the initial light corresponding to the first image from the display component, and perform light path conversion on the initial light corresponding to the first image to form a virtual image corresponding to the first image, wherein the virtual image corresponding to the first image is perceived at a particular position, and a size of the virtual image perceived is greater than a display size of the display component, wherein the light path converting component includes a visible area, the particular position and the display component are located separately at two sides of a plane on which the visible area is located.

DETAILED DESCRIPTION

Hereinafter, the embodiments of the present application will be described in detail with reference to the accompanying drawings.

First, a display device according to an embodiment of the present application will be described with reference to FIGS. 1 to 10B. The display device according to an embodiment of the present application may be applied to any electronic apparatus that includes a display device, and it may be a wearable electronic apparatus or any other type of electronic apparatus. Those skilled in the art will readily appreciate that, in the case of applying the display device according to an embodiment of the present application to a wearable electronic apparatus, the wearable electronic apparatus may be, but not limited to, a headset or wrist-mounted electronic apparatus.

Figure 1:
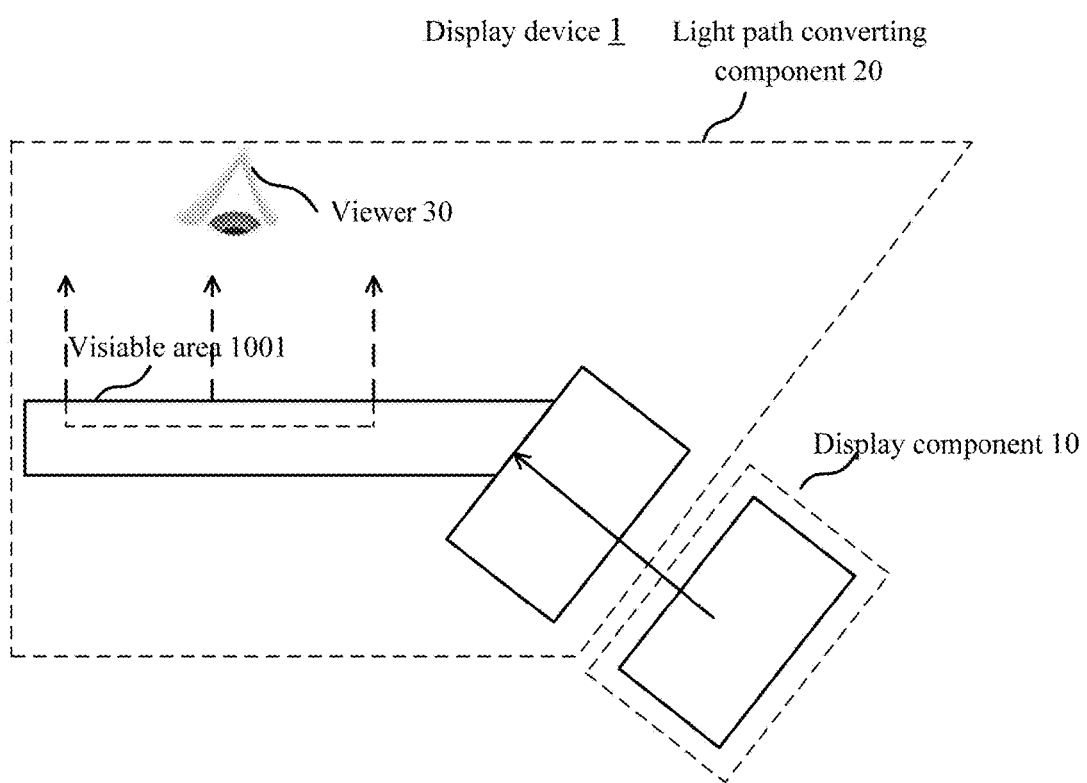
FIG. 1 is a schematic diagram briefly illustrating a display device according to an embodiment of present application.

FIG. 1 is a schematic diagram briefly illustrating a display device according to an embodiment of present application. As shown in FIG. 1, the display device 1 according to an embodiment of the present application includes a display component 10 and a light path converting component 20. The display component 10 is configured to output initial light corresponding to a first image to be displayed by the display device 1 (light indicated by the solid-line arrow shown in FIG. 1). The light path converting component 20 is configured to receive the initial light corresponding to the first image from the display component 10, and perform light path conversion on the initial light corresponding to the first image to form a virtual image corresponding to the first image, so that a viewer 30 at a particular position perceives the virtual image corresponding to the first image, wherein a size of the virtual image perceived is greater than a display size of the display component 10.

Specifically, in an embodiment of the present application, the display component 10 may be for example a self-luminous type display component like an organic light emitting diode (OLED) display, may also be a backlight type display component like a liquid crystal display. The light path converting component 20 may include lens group for collimating and amplifying an image and a waveguide chip or a flexible waveguide for changing an exit direction of the image and so on. Further, the viewer 30 at a particular position can perceive a virtual image corresponding to the first image. Specifically, image is formed at a particular position through the light path converting component 20 as needed by design, for example, as shown in FIG. 1, the light path converting component 20 includes a visible area 1001, which is a portion in the display device that is viewed by the viewer at the particular position so as to perceive the display content. In the display device 1 as shown in FIG. 1, the particular position and the display component 10 are located separately at two sides of a plane on which the visible area 1001 is located. In an embodiment of the present application, the such-configured display device 1 is applied to a wrist-mounted electronic apparatus, wherein the user viewing position and the portion for containing the display panel 10 (such as the fixing device which will be described in detail below) are located separately at two sides of a plane on which the visible area 1001 (such as the dial) of the wrist-mounted electronic apparatus is located. In another embodiment of the present application, the such-configured display device 1 is applied to a head-mounted display (HMD), wherein after the user wears the head-mounted display, the display area 1001 thereof (such as the outer side area of the HMD) can provide content display to users other than the viewer.

Therefore, the display device 1 according to the embodiment of the present application as shown in FIG. 1 is not restricted by size of the electronic apparatus equipped with the display device 1, it provides image or video display with larger size and higher resolution to the viewer at a particular position as needed by design. Specific configurations of the display device according to the first to eighth exemplary embodiments of the present application will be further described below.

Figure 2:
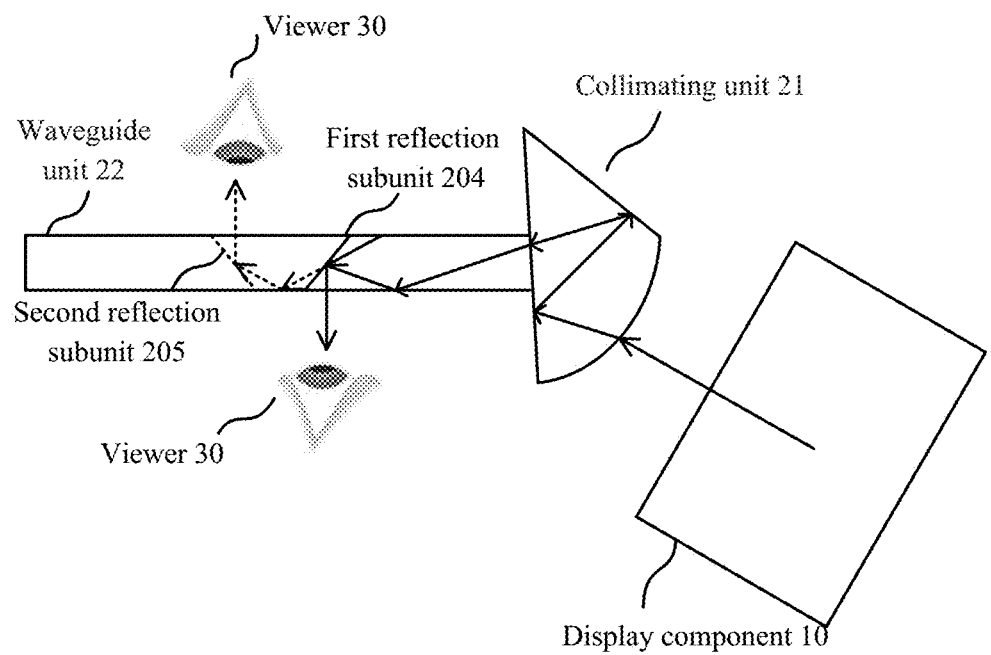
FIG. 2 is a structural block diagram illustrating a display device according to a first exemplary embodiment of the present application.

FIG. 2 is a structural block diagram illustrating a display device according to a first exemplary embodiment of the present application. As illustrated in FIG. 2, in the display device 1 according to the first embodiment of the present application, the light path converting component unit 20 particularly includes a collimating unit 21 and a waveguide unit 22, the collimating unit 21 is configured to collimate the initial light corresponding to the first image from the display component 10 into collimated light corresponding to the first image, and lead the same into the waveguide unit 22; the waveguide unit 22 guides the collimated light from the collimating unit to the particular position, wherein the collimated light corresponding to the first image forms the virtual image corresponding to the first image.

In addition, as shown in FIG. 2, the waveguide unit 22 further includes a first reflection subunit 204 and/or a second reflection subunit 205, it is possible to control to guide the collimated light from the collimating unit 21 and corresponding to the first image to the particular position to exit, by setting the position and angle of the first reflection subunit 204 and/or the second reflection subunit 205. In a first case, the collimating unit 21 and the display component 10 are located at a first side relative to the plane on which the waveguide unit 22 is located, when the first reflection subunit 204 as shown in FIG. 12 is provided, it is possible to exit towards the first side. In a second case, when the second reflection subunit 205 as shown in FIG. 2 is provided, the collimated light corresponding to the first image may exit towards a second side relative to the plane on which the waveguide unit 22 is located, the first side and the second side are opposite sides relative to the plane on which the waveguide unit is located. Specifically, when the display device is applied to for example a head-mounted electronic apparatus, it is possible to adopt the configuration example in the first case, the collimated light corresponding to the first image is made to exit towards the first side, that is, the collimated light is made to exit towards the eyes of a user wearing the head-mounted electronic apparatus. When the display device is applied to for example a wrist-mounted electronic apparatus, it is possible to adopt the configuration example in the second case, the collimated light corresponding to the first image is made to exit towards the second side, that is, the collimated light is made to exit towards the eyes of a user wearing and viewing the wrist-mounted electronic apparatus. In addition, it will be further explained below in detail that the exit direction of the display device is set as required by viewing, for example, rotation of the first reflection subunit 204 and/or the second reflection subunit 205 may be controlled, so as to control the exit direction of the first reflection subunit 204 and/or the second reflection subunit 205, thus achieving a switch of bi-directional display of the display device. In the example shown in FIG. 2, for simplicity of the illustration, internal configurations of the display component 10 and the light path converting component 20 as well as the light path are not shown. Hereinafter, the display component 10 and the light path converting component 20 will be further described in detail respectively.

Figure 3:
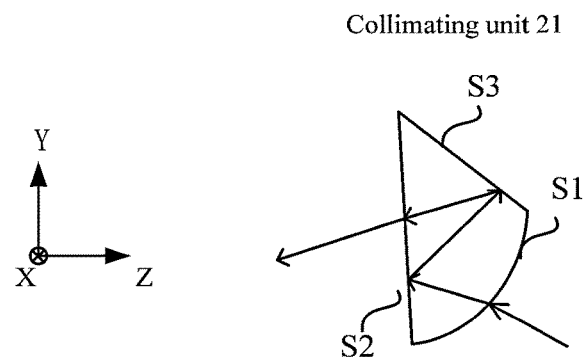
FIG. 3 is a structural block diagram illustrating a collimating unit in a display device according to a first exemplary embodiment of the present application.

FIG. 3 is a structural block diagram illustrating a collimating unit in a display device according to a first exemplary embodiment of the present application. As shown in FIG. 3, the collimating unit 21 includes at least three optical surfaces, at least one among the at least three optical surfaces is a curved surface, the at least one curved surface satisfies a specific curved surface equation, so that the initial light incident on the at least one curved surface and corresponding to the first image is converted into light for forming the amplified virtual image corresponding to the first image. Further, the present application is not limited thereto, the collimating unit 21 may include more than three optical surfaces, and one or more or even all of the optical surfaces of the collimating unit 21 may be a curved surface, and each curved surface satisfies a specific curved surface equation.

Specifically, the at least three optical surfaces include a first optical surface S1, a second optical surface S2, and a third optical surface S3, the initial light corresponding to the first image from the display component transmits through the first optical surface S1, is reflected by the second optical surface S2 and the third optical surface S3 successively, and transmits through the second optical surface S2 and enters the wave guide unit in order.

In order to describe respective curved surfaces of the collimating unit 2 with the curved surface equation, a coordinate system is defined in FIG. 3 as: a center of an exit pupil position is set as an origin of the coordinate system, a YOZ plane is the paper, a Z-axis is horizontally to the right, a Y axis is in a direction vertical to the Z-axis on the paper, an X-axis is vertical to the paper inwardly, thus constituting a right-hand coordinate system. The first optical surface S1, the second optical surface S2, and the third optical surface S3 of the collimating unit 21 as shown in FIG. 3 may be any of the following equations regarding surface shape:
(a) toric equation $$z = \frac{C_x x^2 + C_y y^2}{1 + \{1 - (1 + K_x)C_x^2 x^2 - (1 + K_y)C_y^2 y^2\}^{1/2}} + \sum_{i=1}^{n} A_i \{(1 - P_i)x^2 + (1 + P_i)y^2\}^{i+1} \quad (1)$$

where Cx is a curvature radius of the curved surface in the X direction on the X-Z plane, Cy is a curvature radius of the curved surface in the Y direction on the Y-Z plane, Kx is a conic coefficient of the curved surface in the X direction, Ky is a quadratic surface coefficient of the curved surface in the Y direction, Ai is 4, 6, 8, 10, . . . 2n-order aspheric coefficient and symmetric rotationally about the Z-axis, Pi is 4, 6, 8, 10, . . . 2n-order non-rotationally symmetric coefficient;
(b) XY polynomial curved surface equation $$z(x, y) = \frac{C(x^2 + y^2)}{1 + [1 - (1 + k)C^2(x^2 + y^2)]^{1/2}} + c_4 y^2 + \quad (2)$$
$$c_6 x^2 + c_7 y^3 + c_9 y x^2 + c_{11} y^4 + c_{13} y^2 x^2 + c_{15} x^4 +$$
$$c_{16} y^5 + c_{18} y^3 x^2 + c_{20} y x^4 + c_{22} y^6 + c_{24} y^4 x^2 + c_{26} y^2 x^4 +$$
$$c_{28} x^6 + c_{29} y^7 + c_{31} y^5 x^2 + c_{33} y^3 x^4 + c_{35} y x^6 + \ldots$$

where C a conic coefficient of the curved surface, Ci is polynomial coefficients, it is made symmetric relative to the yoz plane by selecting power of the XY polynomial;
(c) toroidal equation $$z = \frac{cx^2}{1 + [1 - (1 + k)c^2 x^2]^{1/2}} + Ax^4 + Bx^6 + \underline{C}x^8 + Dx^{10} \quad (3)$$

where c is a curvature radius, k is a quadratic surface coefficient, A, B, C, D are 2, 4, 6, 8-order aspheric coefficients, respectively.

In the display device according to the first embodiment of the present application as shown in FIGS. 2 and 3, a free-form curved-surface prism having at least three optical surfaces is adopted as the collimating unit, an optical axis is folded by the free-form curved-surface prism, and the free-form curved-surface is used to reduce a large image difference caused by off-axis of the light path in the system, a single element is adopted to achieve the optical quality that should be achieved by multiple conventional lens. In addition, by using a single free-form curved-surface prism instead of a complex plurality of lens groups, thickness of the display device in the direction of the light path of the light corresponding to the first image is reduced, thereby the overall display device is more lightweight and compact.

Figure 4:
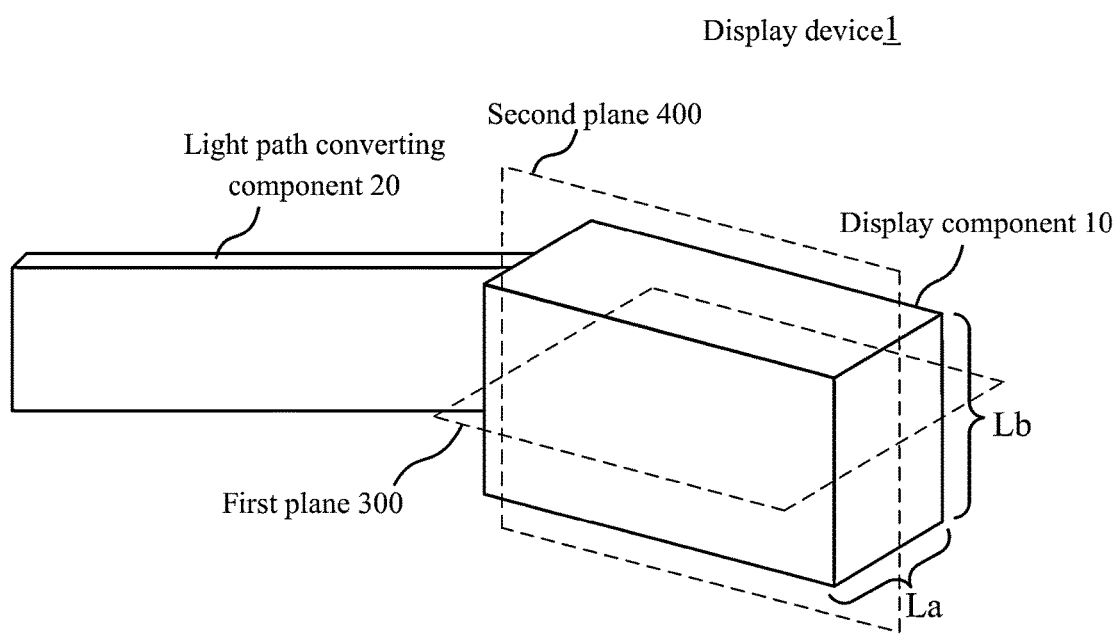
FIG. 4 is a structural block diagram illustrating a display device according to a second exemplary embodiment of the present application.

FIG. 4 is a structural block diagram illustrating a display device according to a second exemplary embodiment of the present application. For simplicity of the illustration, FIG. 4 illustrates merely the display device 1 that includes a display component 10 and a light path converting component 20, internal configurations of the display component 10 and the light path converting component 20 as well as the light path are not shown in FIG. 4.

As illustrated in FIG. 4, light that forms the first image in the display component 10 is on a first plane 300, light that forms the virtual image corresponding to the first image and exits from the light path converting component 20 is on a second plane 400, there is a first angle between the first plane 300 and the second plane 400. In an embodiment of the present application, the first angle is 90 degrees. In this case, a first size La of the display component in a direction vertical to the first plane is made smaller than a second size Lb of the display component in a direction parallel to the first plane. Thus, when the display device 1 is provided within a wearable electronic apparatus, for example, when the electronic apparatus is smart glasses, the display component 10 is provided within a frame at one side (i.e., glass leg) of the smart glasses, it is such configured so that thickness of the frame within which the display component 10 is provided is thinner. Similarly, when the electronic apparatus is a smart watch, the display component 10 is provided within a wrist strap at one side of the smart watch, and it is such configured so that thickness of the wrist strap within which the display component 10 is provided is thinner. Accordingly, the display component 10 according to the second exemplary embodiment of the present application achieves a thickness reduction in a specific direction, and thereby achieves a thickness reduction in a specific direction of the display device 1.

Figure 5A:
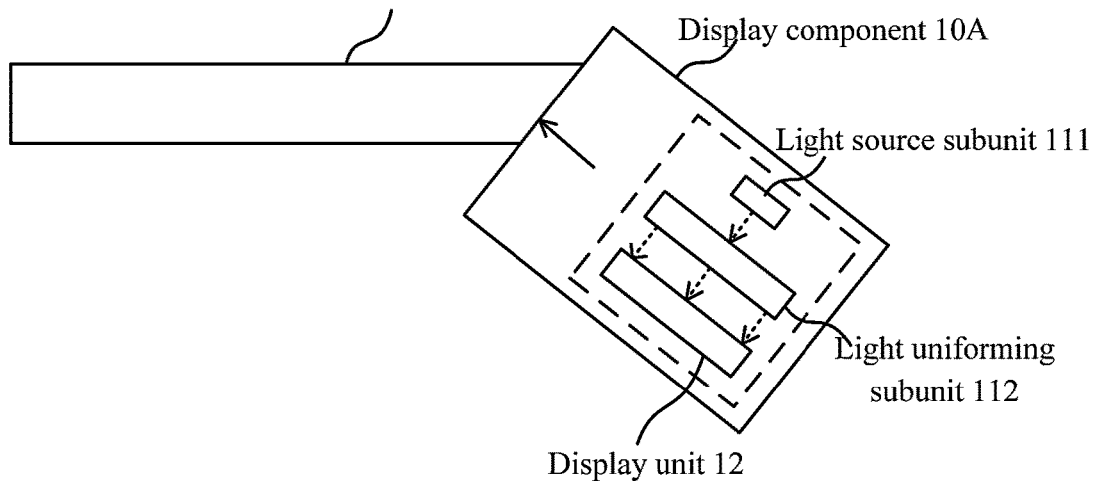
FIGS. 5A and 5B are structural block diagrams respectively illustrating a display device according to the prior art and a display device according to a third exemplary embodiment of the present application.
Figure 5B:
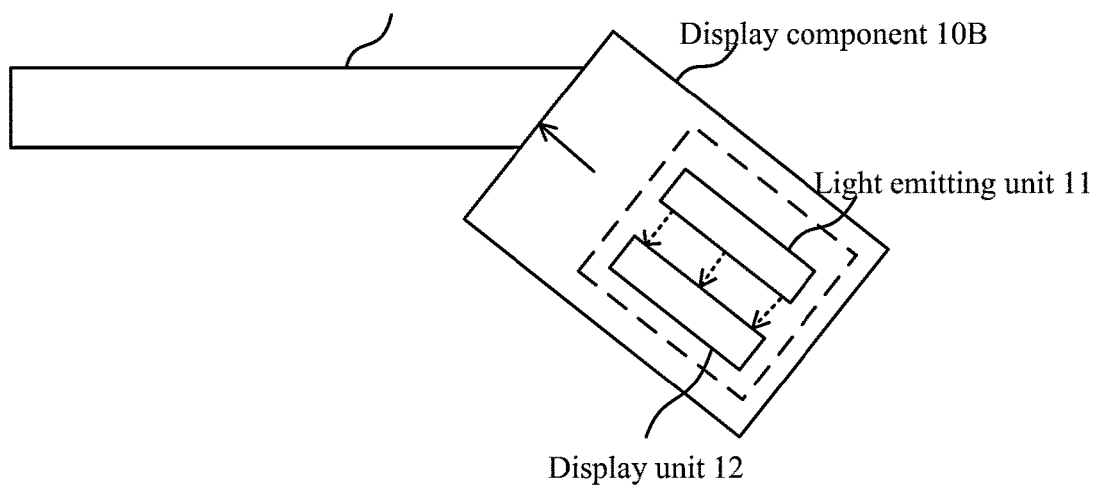

FIGS. 5A and 5B are structural block diagrams respectively illustrating a display device according to the prior art and a display device according to a third exemplary embodiment of the present application. Similar to the display device according to the second exemplary embodiment of the present application as shown in FIG. 4, the display device 1 according to the third exemplary embodiment of the present application also includes a display component 10 and a light path converting component 20. As shown in FIG. 5A, the conventional display component 10A specifically includes a light source subunit 111, a light uniforming subunit 112, and a display unit 12, wherein the light uniforming subunit 112 sets the light source subunit 111 overlapped in an emission direction of the initial light corresponding to the first image, and uniforms a point light source emitted by the light source subunit 111 as backlight. Different than that, as shown in FIG. 5B, in the display device 1 according to the second exemplary embodiment of the present application, the display component 10B specifically includes a light emitting unit 11 and a display unit 12. The light emitting unit 11 is configured to generate and emit plane backlight (light indicated by the dotted-line arrow shown in FIG. 5B), which is on the first plane as described with reference to FIG. 4. The display unit 12 is provided within an irradiation area of the backlight, and configured to generate the initial light corresponding to the first image based on the first image (e.g. light indicated by the solid-line arrow shown in FIG. 5B).

Therefore, in the display device according to the third exemplary embodiment of the present application as shown in FIG. 5B, a combination manner of a single point light source and an optical light uniforming system as shown in FIG. 5A is replaced with a single light emitting unit 11 that emits plane backlight, so that thickness of the display component 10 in the display device according to the third exemplary embodiment of the present application is reduced in the emission direction of the initial light corresponding to the first image.

Figure 6:
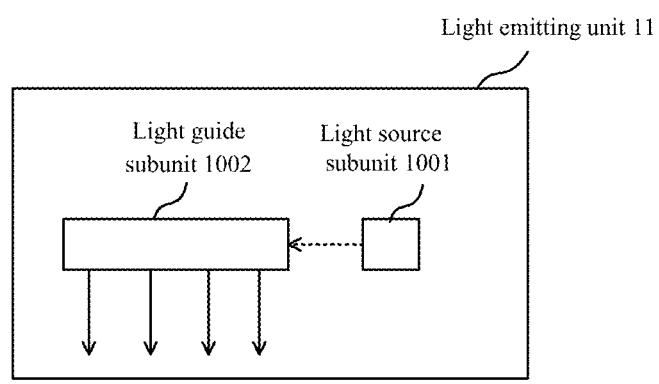
FIG. 6 is a structural block diagram illustrating a light emitting unit in a display device according to a fourth exemplary embodiment of the present application.

FIG. 6 is a structural block diagram illustrating a light emitting unit in a display device according to a fourth exemplary embodiment of the present application. The light emitting unit 11 as shown in FIG. 6 may be an implementation of the light emitting unit that emits plane backlight in the display device according to the third exemplary embodiment of the present application as shown in FIG. 3. The light emitting unit 11 in the display device according to the fourth exemplary embodiment of the present application includes a light source unit 1001 and a light guide subunit 1002 in particular. Specifically, the light source subunit 101 is configured to emit light towards a second direction (light indicated by the dotted-line arrow shown in FIG. 6), the light guide subunit 1002 is provided within an irradiation area of the light, the light transmits through the light guide subunit 1002 to form the backlight (light indicated by the solid-line arrow shown in FIG. 6). That is, the light guide subunit 1002 converts light emitted by the light source subunit 101 which serves as a single point light source into plane backlight, which is located on the first plane described above with reference to FIG. 4. In an embodiment of the present application, the light source subunit 101 may be an LED light source, and the light emitting unit 11 may further include an optical film. Thickness of the whole light emitting unit 11 is controlled for example within 1.5 mm, and the emission angle of the plane backlight converted by the light guide subunit 1002 is controlled within 14 degrees, that is, an maximum angle between an exit direction of the backlight formed by the light guide subunit 1002 and the second direction is 7 degrees. Therefore, the exit direction of the plane backlight converted by the light guide subunit 1002 approximately is considered as in the same direction (i.e., the second direction), which avoids the generation of stray light that exits towards a direction different than the second direction.

Therefore, in the light emitting unit 11 of the display device according to the fourth exemplary embodiment of the present application, the light emission direction of the light source subunit 101 is different than the light emission direction of the light converted by the light guide subunit 1002 (i.e., in a direction vertical to the emission direction of the backlight, the light source subunit 101 is provided at a side of the light guide subunit 1002), so that in comparison with the case of providing the light source subunit and the light guide subunit overlapped in the emission direction of the backlight, thickness of the display component 10 in the display device 3 according to the fourth exemplary embodiment of the present application is reduced in the emission direction of the initial light corresponding to the first image.

Figure 7:
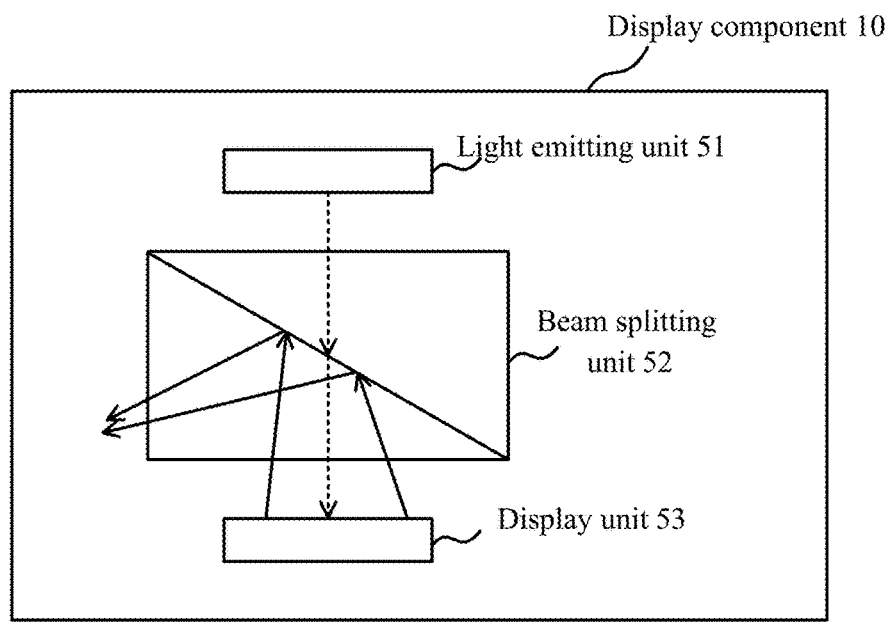
FIG. 7 is a structural block diagram illustrating a display component in a display device according to a fifth exemplary embodiment of the present application.

FIG. 7 is a structural block diagram illustrating a display component in a display device according to a fifth exemplary embodiment of the present application. As shown in FIG. 7, the display component 10 in the display device according to the fifth exemplary embodiment of the present application includes a light emitting unit 51, a display unit 52, and a beam splitting unit 53. Specifically, the light emitting unit 51 is configured to emit backlight (light indicated by the dotted-line arrow shown in FIG. 7). As described above, the light emitting unit 51 may be a light emitting unit that emits plane backlight as described above with reference to FIGS. 5B and 6. The backlight from the light emitting unit 51 transmits through the beam splitting unit 53. In an embodiment of the present application, the beam splitting unit 53 is a polarization beam splitter (PBS). P-polarized backlight emitted by the light emitting unit 51 transmits through the PSB that serves as the beam splitting unit 53, so as to illuminate the display unit 52. The display unit 52 is provided within an irradiation area of the backlight, and configured to generate the initial light corresponding to the first image based on the first image (light indicated by the solid-line arrow shown in FIG. 7). Further, the initial light corresponding to the first image from the display unit 52 (after being modulated as S-polarized light) is reflected at the PBS which serves as the beam splitting unit 53, to be guided to the light path converting component via the beam splitting unit 53.

Figure 8:
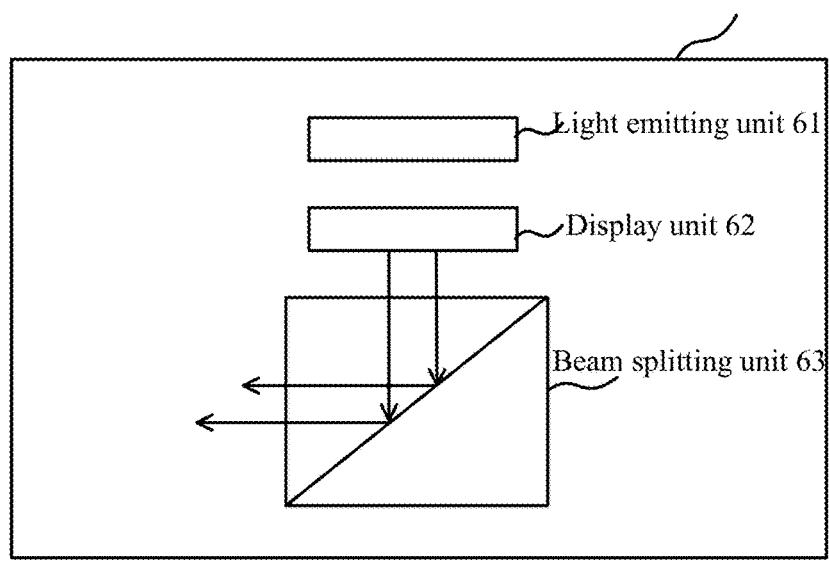
FIG. 8 is a structural block diagram illustrating a display component in a display device according to a sixth exemplary embodiment of the present application.

FIG. 8 is a structural block diagram illustrating a display component in a display device according to a sixth exemplary embodiment of the present application. As shown in FIG. 8, the display component 10 in the display device according to the sixth exemplary embodiment of the present application includes a light emitting unit 61, a display unit 62, and a beam splitting unit 63. Specifically, the display unit 62 is configured to generate a display signal corresponding to the first image based on the first image. The light emitting unit 61 is configured to generate the initial light corresponding to the first image based on the display signal. That is, the light emitting unit 61 and the display unit 62 in the display device according to the sixth exemplary embodiment of the present application may be implemented as a self-luminous type OLED display device, the display unit 62 is a control unit that generates a display drive signal based on the first image to be displayed, the light emitting unit 61 is a self-luminous layer that executes emitting display based on the received display drive signal. Similar to the case described with reference to FIG. 7, the beam splitting unit 63 is configured to guide the initial light corresponding to the first image from the display unit to the light path converting component. In an embodiment of the present application, the beam splitting unit 63 is a polarization beam splitter (PBS).

Therefore, in the display component 10 of the display device according to the sixth exemplary embodiment of the present application, the display unit and the light emitting unit are integrally provided on one side of the beam splitting unit, so that a size of the display device in the direction of generating the initial light is smaller than a size of display device in the direction of generating the initial light in the case where the display unit and the light emitting unit are integrally provided on both sides of the beam splitting unit (the case shown with reference to FIG. 7).

Figure 9:
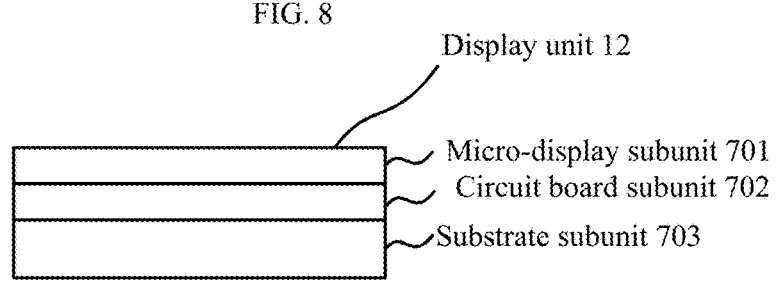
FIG. 9 is a structural block diagram illustrating a display unit in a display device according to a seventh exemplary embodiment of the present application.

FIG. 9 is a structural block diagram illustrating a display unit in a display device according to a seventh exemplary embodiment of the present application. The display unit 12 shown in FIG. 9 may be applied to the display component described with reference to FIGS. 5 to 8. As shown in FIG. 9, the display unit 12 includes a micro-display subunit 701, a circuit board subunit 702, and a substrate subunit 703. Specifically, the micro-display subunit 701 is configured with an array of a plurality of pixel cells, each pixel cell being used for generating the initial light corresponding to the first image. The circuit board subunit 702 is configured to provide a control signal based on the first image to control the pixel cells in the micro-display subunit 701 to generate the initial light corresponding to the first image. The substrate subunit 703 is configured to arrange the micro-display subunit 701 and the circuit board subunit 702 thereon. Flexural strength and fracture toughness of the substrate subunit 703 may be denoted by the following equations:

$$\sigma_f = \sqrt{\frac{2E\gamma_f}{C}} \quad \text{(Equation 1)}$$

$$K_{ZC} = \sqrt{2Z\gamma_f} \quad \text{(Equation 2)}$$

where $\sigma_f$ is flexural strength, $K_{ZC}$ is fracture toughness, E is elastic modulus, $\gamma_f$ is fracture energy, and C is crack size. As can be seen from the above Equations 1 and 2, in order to improve strength of the material, fracture energy and elastic modulus must be increased, to reduce fracture size. To achieve toughness of the material, fracture energy and elastic modulus must be increased. In the prior art, the substrate subunit is typically made from metal material like aluminum, which always reaches a thickness of 1.6 mm. Elastic modulus of the non-metallic material, like ceramic material, is much larger than that of the metals, often higher by one to several times.

Thus, in the display unit of the display device according to the seventh exemplary embodiment of the present application, the substrate subunit 703 is made from non-metallic material that satisfies a predetermined intension, so that thickness of the substrate subunit is lower than that of the substrate subunit 703 made from metallic material that satisfies a predetermined intension (e.g., as low as 0.25 mm).

Figure 10A:
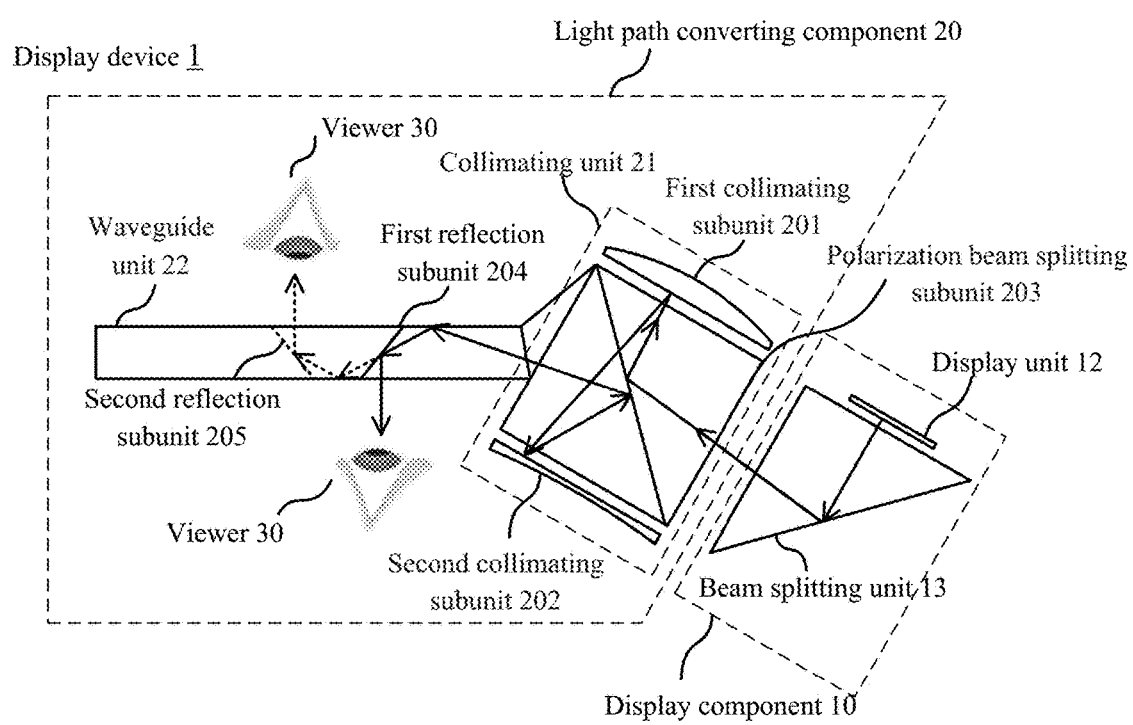
FIGS. 10A and 10B are structural block diagrams illustrating a display device according to an eighth exemplary embodiment of the present application.
Figure 10B:
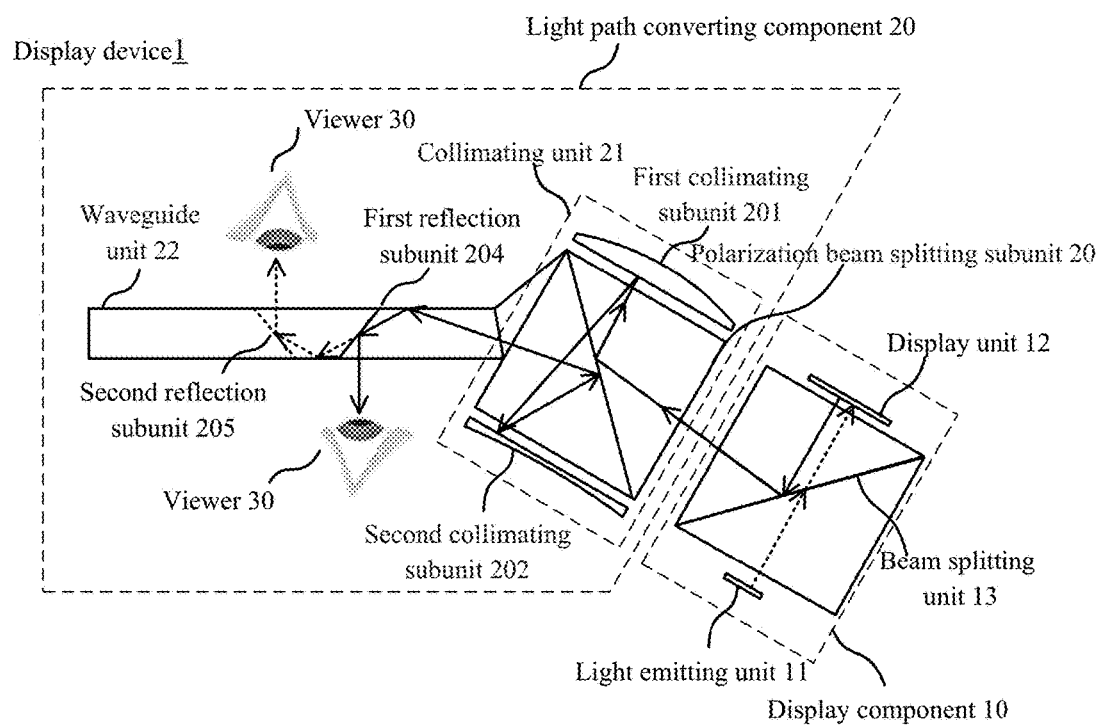

FIGS. 10A and 10B are structural block diagrams illustrating a display device according to a seventh exemplary embodiment of the present application. Similar to the display device described with reference to FIG. 1, the display device 1 according to the eighth exemplary embodiment of the present application as shown in FIGS. 10A and 10B also includes a display component 10 and a light path converting component 20.

Specifically, the display component 10 includes a display unit 12 and a beam splitting unit 13 (as shown in FIG. 10A), this type of display component has already been described above with reference to FIG. 8. Alternatively, the display component 10 includes a light emitting unit 11, a display unit 12, and a beam splitting unit 13 (as shown in FIG. 10B), this type of display component has already been described above with reference to FIG. 7. Here, repeated descriptions of the display component 10 and its light path will be omitted.

As shown in FIGS. 10A and 10B, the light path converting component unit 20 further includes a collimating unit 21 and a waveguide unit 22, the collimating unit 21 is configured to collimate the initial light corresponding to the first image from the display component 10 into collimated light corresponding to the first image, and lead the same into the waveguide unit. Specifically, the collimating unit 21 includes a first collimating subunit 201 and a second collimating subunit 202 provided opposite to each other, and a polarization beam splitting subunit 203 provided between the first collimating subunit 201 and the second collimating subunit 202, the initial light corresponding to the first image from the display component 10 is reflected by the polarization beam splitting subunit 203 to the first collimating subunit 201, thereafter it is collimated by the first collimating subunit 201 and the second collimating subunit 202, and exited by the polarization beam splitting unit 203 as the collimated light corresponding to the first image. The waveguide unit 22 guides the collimated light from the collimating unit 21 to the particular position, wherein the collimated light corresponding to the first image is for forming the virtual image corresponding to the first image. In an embodiment of the present application, the first collimating subunit 201 and the second collimating subunit 202 may be a single lens or a lens group as needed by design. It is possible to implement adjustment of a size of the virtual image corresponding to the first image by adjusting the relative position of the lens or lens group by which the first collimating subunit 201 and the second collimating subunit 202 are configured.

In addition, as shown in FIGS. 10A and 10B, the waveguide unit 22 further includes a first reflection subunit 204 and/or a second reflection subunit 205, it is possible to control to guide the collimated light from the collimating unit 21 and corresponding to the first image to the particular position to exit, by setting the position and angle of the first reflection subunit 204 and/or the second reflection subunit 205. In a first case, the collimating unit 21 and the display component 10 are located at a first side relative to the plane on which the waveguide unit 22 is located, when the first reflection subunit 204 as shown in FIGS. 10A and 10B is provided, it is possible to exit towards the first side. In a second case, when the second reflection subunit 205 as shown in FIGS. 10A and 10B is provided, the collimated light corresponding to the first image may exit towards a second side relative to the plane on which the waveguide unit 22 is located, the first side and the second side are opposite sides relative to the plane on which the waveguide unit is located. Specifically, when the display device is applied to for example a head-mounted electronic apparatus, it is possible to adopt the configuration example in the first case, the collimated light corresponding to the first image is made to exit towards the first side, that is, the collimated light is made to exit towards the eyes of a user wearing the head-mounted electronic apparatus. When the display device is applied to for example a wrist-mounted electronic apparatus, it is possible to adopt the configuration example in the second case, the collimated light corresponding to the first image is made to exit towards the second side, that is, the collimated light is made to exit towards the eyes of a user wearing and viewing the wrist-mounted electronic apparatus. In addition, it will be further explained below in detail that the exit direction of the display device is set as required by viewing, for example, rotation of the first reflection subunit 204 and/or the second reflection subunit 205 may be controlled, so as to control the exit direction of the first reflection subunit 204 and/or the second reflection subunit 205, thus achieving a switch of bi-directional display of the display device.

Therefore, in the display device according to the eighth exemplary embodiment of the present application, in the collimating unit 211, a folded imaging light path between the first collimating subunit 201 and the second collimating subunit 202 is implemented by using the polarization beam splitter 203, thereby an overall size of the display device is reduced.

Figure 11:
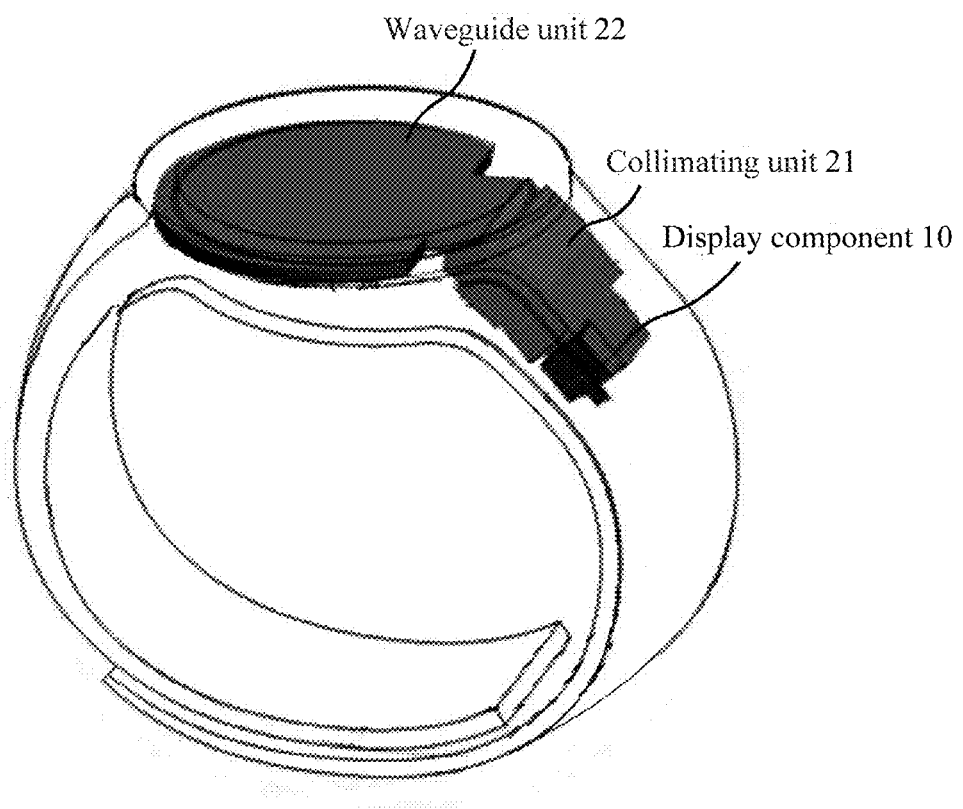
FIG. 11 is a schematic diagram illustrating a display device according to an embodiment of the present application is applied to an electronic apparatus.

FIG. 11 is a schematic diagram illustrating a display device according to an embodiment of the present application is applied to an electronic apparatus. As shown in FIG. 11, when the display device according to the embodiment of the present application is applied to an electronic apparatus, an outer side surface of the waveguide unit 22 adjacent to an exit surface of the collimated light is configured as needed. In an embodiment of the present application, an outer side surface of the waveguide unit 22 adjacent to an exit surface of the collimated light is a curved surface. For example, when the display device shown in FIG. 11 is applied to a wrist-mounted electronic apparatus, the outer side surface of the waveguide unit 22 (i.e., the visible area of the display device) needs to be adaptive to the shape of an outer frame of the strap-type electronic apparatus (i.e., dial of the smart watch), it is configured as a curved surface (preferably configured as circular). As will be readily appreciated by those skilled in the art, the technical solutions of the first to eighth exemplary embodiments of the present application as described above with reference to FIGS. 2 to 10B are configured in combination as needed, which all falls within the scope claimed by the present application. For example, in the display device according to the embodiment of the present application, it is impossible to configure the display direction of the visible area of the display device according to design requirement of the electronic apparatus to which the display device is applied to, thus being adaptive to the electronic apparatus in a different using state (as shown in FIG. 2): in the display device according to the embodiment of the present application, a free-form curved-surface prism is adopted as the collimating unit, an optical axis is folded by the free-form curved-surface prism, and the free-form curved-surface is used to reduce a large image difference caused by off-axis of the light path in the system, a single element is adopted to achieve the optical quality that should be achieved by multiple conventional lens (as shown in FIGS. 2 and 3); it may be configured that light that forms the first image in the display component 10 is on a first plane 300, light that forms the virtual image corresponding to the first image and exits from the light path converting component 20 is on a second plane 400, there is a first angle between the first plane 300 and the second plane 400, so that a first size of the display component in a direction vertical to the first plane is smaller than a second size of the display component in a direction parallel to the first plane (as shown in FIG. 4); meanwhile, the display component 10 may adopt a single plane light source as backlight or use the light source subunit provided at a side of the light guide subunit to generate a plane light source, so that thickness of the display component 10 in the display device is reduced in the emission direction of the initial light corresponding to the first image (as shown in FIGS. 5B and 6); further, the display unit and the light emitting unit are integrally provided on one side of the beam splitting unit, so that a size of the display device in the direction of generating the initial light is smaller than a size of display device in the direction of generating the initial light in the case where the display unit and the light emitting unit are integrally provided on both sides of the beam splitting unit (as shown in FIG. 8); meanwhile, the substrate subunit in the display unit of the display device is made from non-metallic material that satisfies a predetermined intension, and thickness of the substrate subunit is less than that of the substrate subunit made from metallic material that satisfies a predetermined intension (as shown in FIG. 9); and meanwhile, a folded imaging light path is implemented in the collimating unit by using the polarization beam splitter, thereby an overall size of the display device is reduced.

In the above, the display device according to the embodiments of the present application is described with reference to FIGS. 1 to 11. Hereinafter, an electronic apparatus to which the display device according to the embodiments of the present application is applied will be further described.

An electronic apparatus to which the display device according to the embodiments of the present application is applied may be any electronic apparatus that includes a display device, it may be a wearable electronic apparatus or any other type of electronic apparatus. In the case where the electronic apparatus is a wearable electronic apparatus, the electronic apparatus comprises a body device and a fixing device connected with the body device and configured to fix a position relationship relative to a user of the electronic apparatus. Further, in the case where the electronic apparatus is a head-mounted electronic apparatus, the fixing device may have a corresponding support component according to the shape of the head-mounted electronic apparatus (e.g., the head-mounted electronic apparatus is smart glasses or a helmet-type display). For example, in the case of the smart glasses, the fixing device is two support components connected at both ends of the smart glasses (i.e., glass legs and nose holder), or three support components connected at both ends and in the middle of the smart glasses (i.e., glass legs and nose holder and glass frame), so that the glass legs located at two ends of the space and the nose holder located in the middle of the space form an approximate rectangular space for surrounding a person's head. When the user wears the helmet-type electronic apparatus, a visible area of the display device is set within the region of the user's eye, so that the emission direction of the display device is towards the user's eyes. Further, the electronic apparatus may also be a wrist-mounted electronic apparatus, descriptions will be provided below in further detail with reference to the accompanying drawings.

Figure 12A:
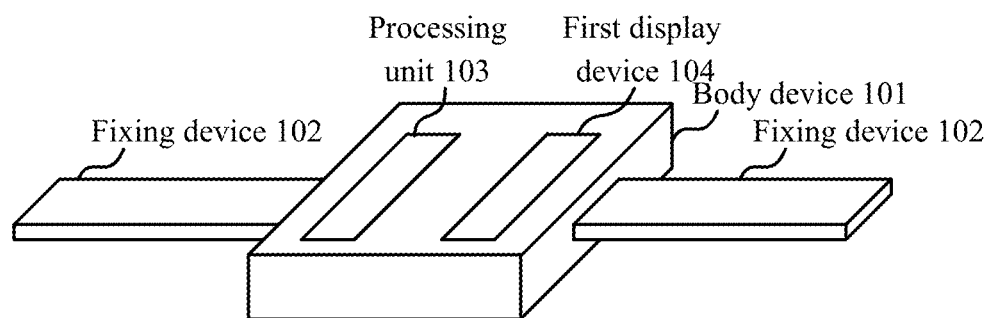
FIGS. 12A to 12E are structural block diagrams illustrating an electronic apparatus according to an embodiment of the present application.

FIGS. 12A to 12E are structural block diagrams illustrating an electronic apparatus according to an embodiment of the present application. As shown in FIG. 12A, the electronic apparatus 100 according to an embodiment of the present application comprises a body device 101 and a fixing device 102 connected with the body device 101. The fixing device 102 includes at least a fixed state in which the fixing device 102 serves as at least a portion of an annular space or an approximate annular space that satisfies a first predetermined condition, the annular space or the approximate annular space surrounds periphery of a columnar body that satisfies a second predetermined condition.

Figure 12B:
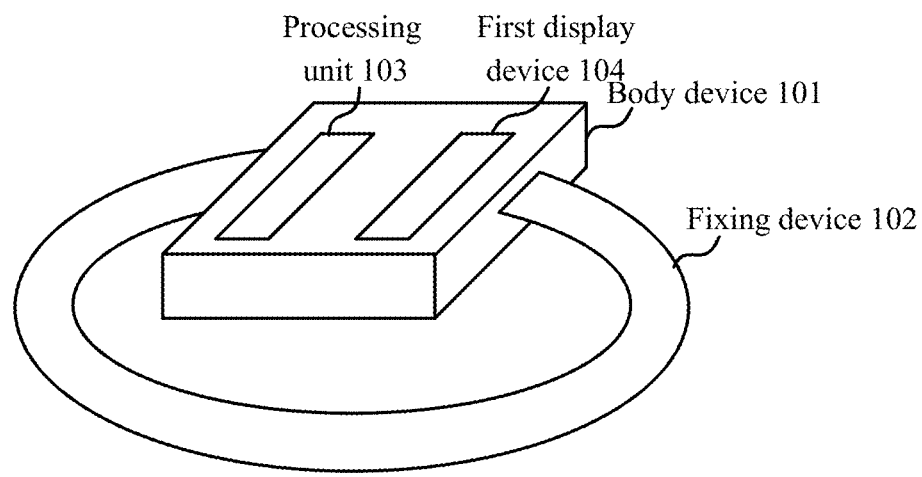
Figure 12C:
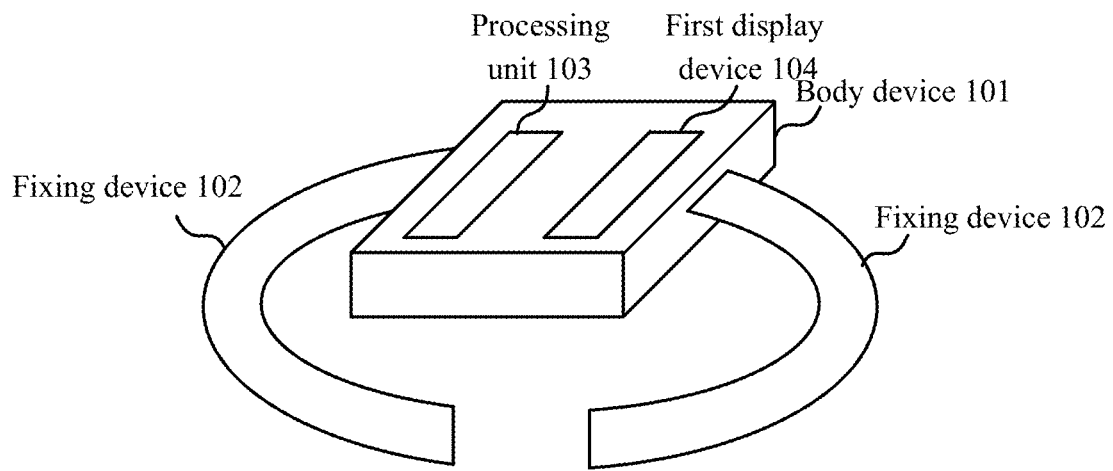

Specifically, FIGS. 12B and 12C respectively illustrate two fixed states that the fixing device 102 is connected with the body device 101. In a first fixed state as shown in FIG. 12B, the fixing device 102 and the body device 101 form a closed annular space, wherein the fixing device 102 and the body device 101 constitute a portion of the annular space, respectively. In a second fixed state as shown in FIG. 12C, the fixing device 102 and the body device 101 form an approximate annular space with a small opening, wherein the fixing device 102 and the body device 101 constitute a portion of the approximate annular space, respectively. In an embodiment of the present application, the body device 101 is a dial portion of a smart watch, and the fixing device 102 is a strap portion of the smart watch. The annular space or the approximate annular space formed by the fixing device 102 and the body device 101 surround the wrist of the user of the smart watch which serves as the columnar body, and a diameter of the annular space or the approximate annular space is greater than a diameter of the user's wrist and smaller than a diameter of the user's fist.

Figure 12D:
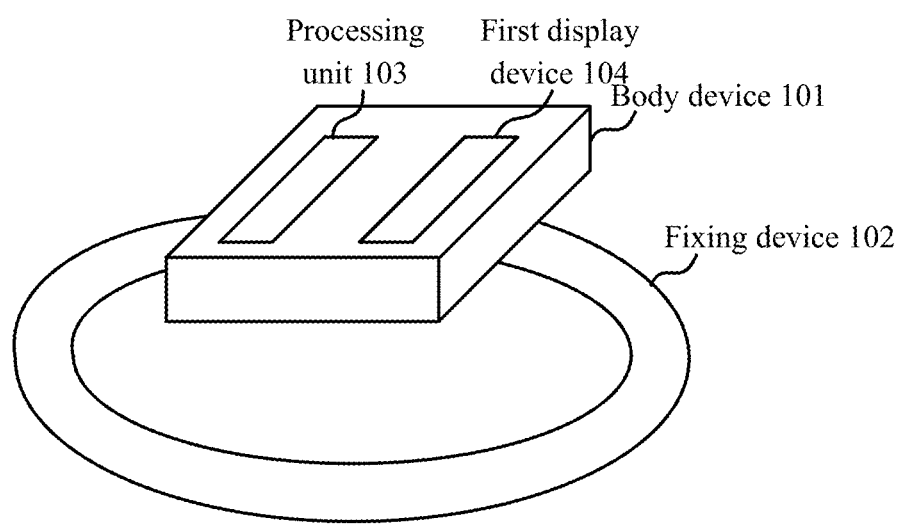
Figure 12E:
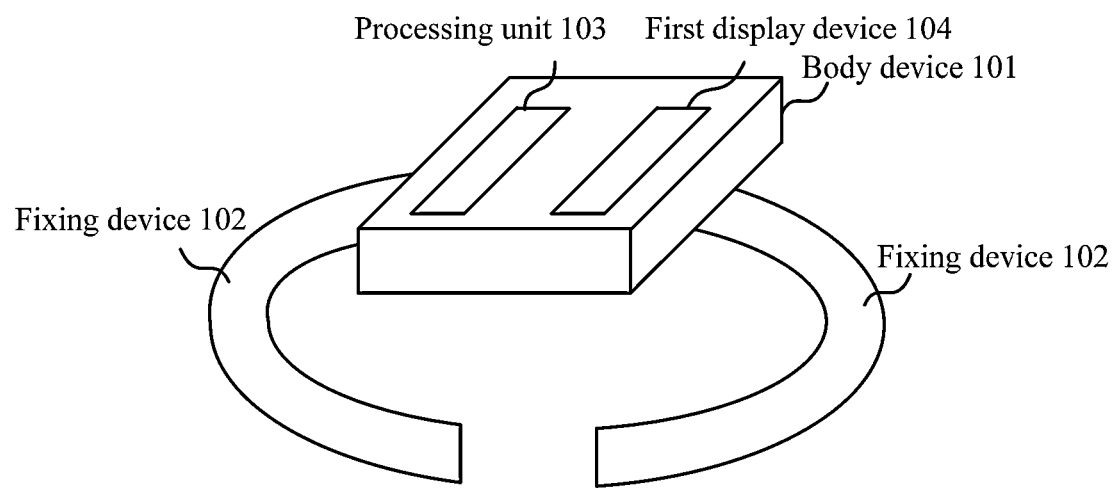

Further, of course, the annular space or the approximate annular space may be formed by the fixing device 102 alone. As shown in FIGS. 12D and 12E, the body device 101 may be provided on the fixing device 102 (i.e., the body device 101 is attached to the fixing device 102 in the manner of surface contact), so that the fixing device 102 alone forms the annular space (FIG. 12D) or the approximate annular space (FIG. 12E) that surrounds the columnar body. The fixing device 102 is arranged with a fixing mechanism like hasps, snaps, zippers and so on (not shown).

Further, as shown in FIGS. 12A to 12E, a processing unit 103 and a first display device 104 are arranged on the body device 101. The processing unit 103 is configured to generate a first image to be displayed and execute display control. In the electronic apparatus 100 shown in FIGS. 12A to 12E, the first display device 104 is arranged on the body device 101. However, as will be readily appreciated by those skilled in the art, the present application is not limited thereto, the first display device 104 may also be arranged on the fixing device 102, or arranged across the body device 101 and the fixing device 102. The first display device 104 is the display device according to the embodiments of the present application described above with reference to FIGS. 1 to 11. That is, the first display device 104 includes a display component (not shown) configured to output initial light corresponding to a first image; and a light path converting component (not shown) configured to receive the initial light corresponding to the first image from the display component, and perform light path conversion on the initial light corresponding to the first image to form a virtual image corresponding to the first image, so that a viewer at a particular position perceives the virtual image corresponding to the first image, wherein a size of the virtual image perceived is greater than a display size of the display component.

Figure 13:
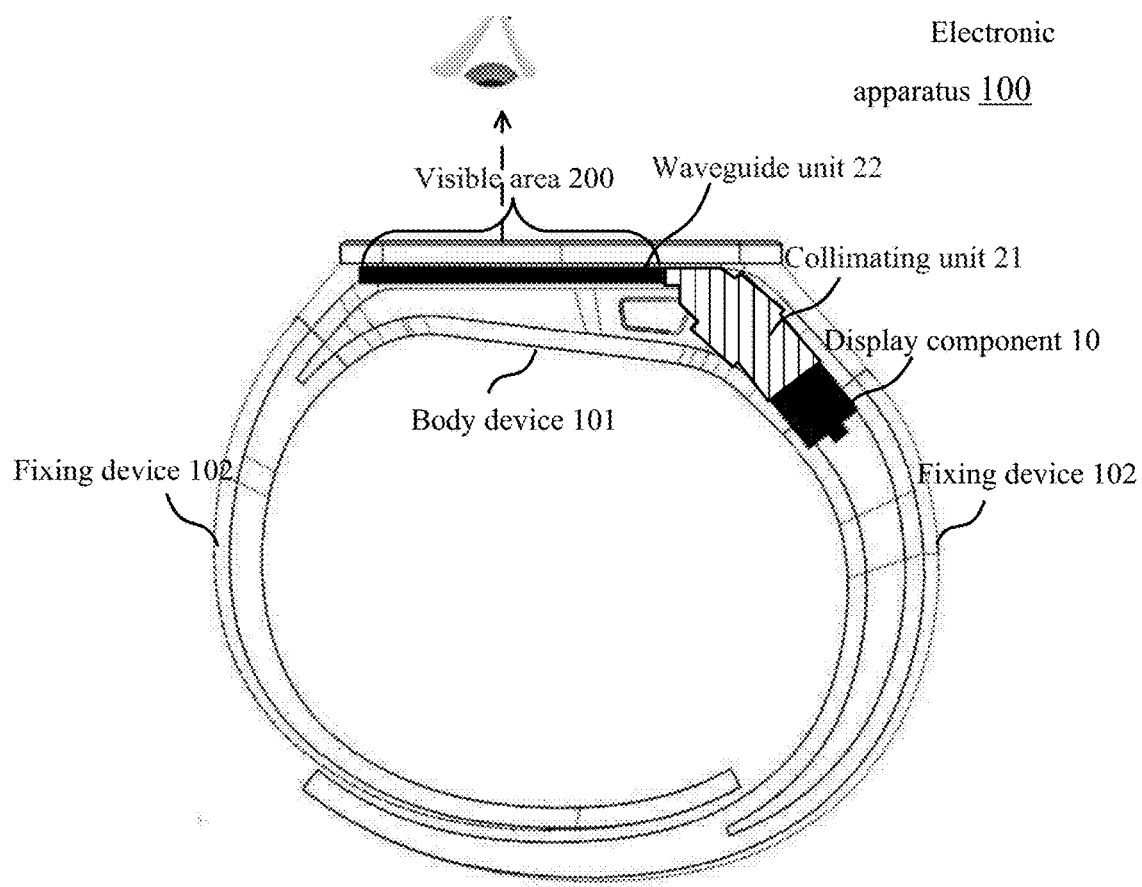
FIG. 13 is a schematic diagram illustrating an electronic apparatus according to an embodiment of the present application.

FIG. 13 is a schematic diagram illustrating an electronic apparatus 100 according to an embodiment of the present application. As shown in FIG. 13, the first display device 104 includes a display component 10, a collimating unit 21, and a waveguide unit 22, here, detailed descriptions of these respective units are omitted for simplification.

Further, the first display device 104 has a visible area 200, which is at least a portion of the surface that exits light of the waveguide unit 22, the visible area 200 corresponds to the portion in the light path converting component from which the light corresponding to the first image exits from the light path converting component, and the visible area 200 is set within the body device 101. Like the display device according to the first embodiment of the present application described with reference to FIG. 1, the particular position and the display component 10 are located separately at two sides of a plane on which the visible area is located. Of course, scope of the present application is not limited thereto, as to be described below in detail, the visible area 200 may also be set within the fixing device 102, or provided across the body device 101 and the fixing device 102. In addition, the particular position and the display component 10 may be located at the same side of the visible area 200.

In addition, in the embodiment as shown in FIG. 13, light transparency of the wave guide unit 22 in a direction of the guiding the collimated light corresponding to the first image to the particular position to exit satisfies a predetermined condition. In this way, light transparency of the portion by which the user directly views with eyes of the wave guide unit 22 satisfies the predetermined condition, and light transparency of the portion by which the user does not directly view with eyes does not need to satisfy the predetermined condition. The predetermined condition may be that light transparency is greater than a predetermined value (such as 70%). In this way, the user sees his/her own skin through the electronic apparatus 100. In addition, in another embodiment, light transparency of the wave guide unit 22 in a direction opposite to the direction of the guiding the collimated light corresponding to the first image to the particular position to exit satisfies a predetermined condition, so that the user observes an external situation through the wave guide unit 22 while viewing the display in the visible area of the wave guide unit 22, the wave guide unit 22 and the actual external situation form an augmented reality.

Further, in the embodiment shown in FIG. 13, a partial area of the waveguide unit 22 and the collimating unit 21 are provided across the body device 101 and the fixing device 102, and the display component 10 is provided within the body device 101. As will be readily appreciated, internal configuration of the electronic apparatus according to the embodiment of the present application is not limited thereto. The other areas in the light path converting component outside the visible area are set within the body device 101 and/or the fixing device 102, and the display component 10 is provided within the body device 101 and/or the fixing device 102, wherein an angle between the visible area 200 and the other areas outside the visible area 200 is within a predetermined angle range (e.g., between 0 to 90 degrees, preferably between 20 to 30 degrees).

In addition, in the embodiment shown in FIG. 13, the collimating unit 21, the waveguide unit 22, and display component 10 adopts the specific configurations according to the first to eighth embodiments described in the above with reference to FIG. 1 to 10B alone or in combination, here, repeated descriptions are omitted.

Figure 14:
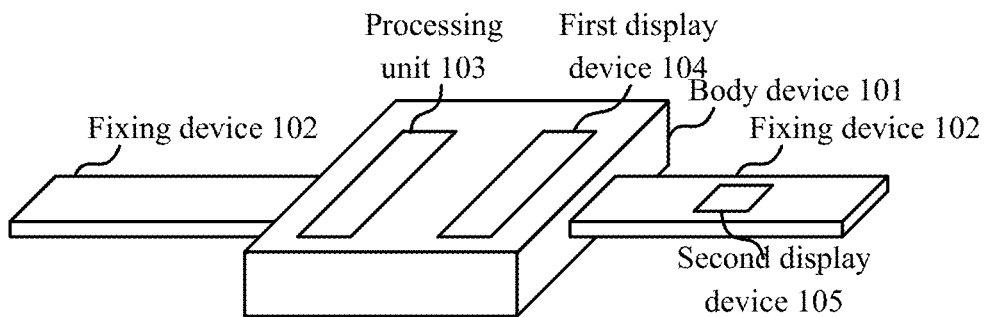
FIG. 14 is another structural block diagram illustrating an electronic apparatus according to an embodiment of the present application.

FIG. 14 is another structural block diagram illustrating an electronic apparatus according to an embodiment of the present application. Compared with the electronic apparatus 100 according to the embodiment of the present application as described above with reference to FIGS. 12A to 12E, the electronic apparatus 110 according to a second embodiment of the present application as shown in FIG. 14 further comprises a second display device 105. The second display device 105 is a display device whose type is different than that of the first display device 104. For example, the second display device 105 includes, but not limited to, a liquid crystal display device, an organic electroluminescent display device, an organic light emitting diode display device, an E Ink type display device or the like.

One of the first display device 104 and the second display device 105 is provided on the body device 101, and the other is provided on the fixing device 102. As shown in FIG. 14, the first display device 104 is provided on the body device 101 and the second display device 105 is provided on the fixing device 102. Of course, the second display device 105 may be provided on the body device 101, and the first display device 104 is provided on the fixing device 102. Similar to the first display device 104, a display direction of the second display device 105 is the outward direction of the annular space or the approximate annular space. Typically, the second display device 105 is for displaying content that needs not be amplified to display like time indication.

Moreover, not limited to the case shown in FIG. 14, the first display device 104 and the second display device 105 may be simultaneously provided on the body device 101 or the fixing device 102. For example, the first display device 104 and the second display device 105 are provided on the body device 101 side by side. Alternatively, the first display device 104 and the second display device 105 are provided at two opposite positions through the radial direction of the fixing device 102.

Figure 15:
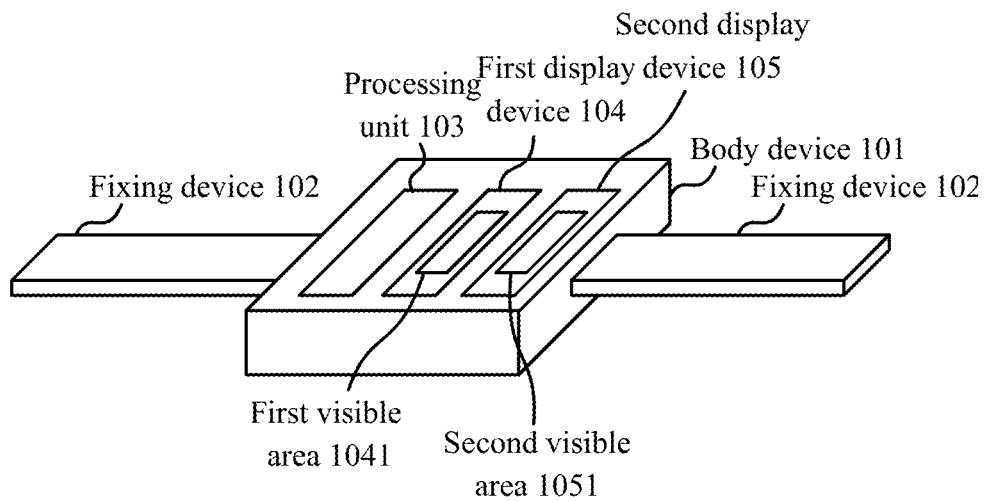
FIG. 15 is another structural block diagram illustrating an electronic apparatus according to an embodiment of the present application.

The visible areas within the display device will be further introduced. FIG. 15 is another structural block diagram illustrating an electronic apparatus according to an embodiment of the present application. Compared with the electronic apparatus 100 according to an embodiment of the present application as described above with reference to FIGS. 12A to 12E, in the electronic apparatus 150 according to an embodiment of the present application as shown in FIG. 15, the first display device 104 includes a first visible area 1041, the second display device 105 includes a second visible area 1051, both the first visible area 1041 and the second visible area 1051 are provided on the body device 101. As will be readily appreciated, the first visible area 1041 and the second visible area 1051 may be both provided on the body device 101, or alternatively, one of the first visible area 1041 and the second visible area 1051 is provided on the body device 101 and the other is provided on the fixing device 102. As described above, the first visible area 1041 and the second visible area 1051 are areas that are viewed by the user to perceive the displayed content in the first display device 104 and the second display device 105.

Figure 16A:
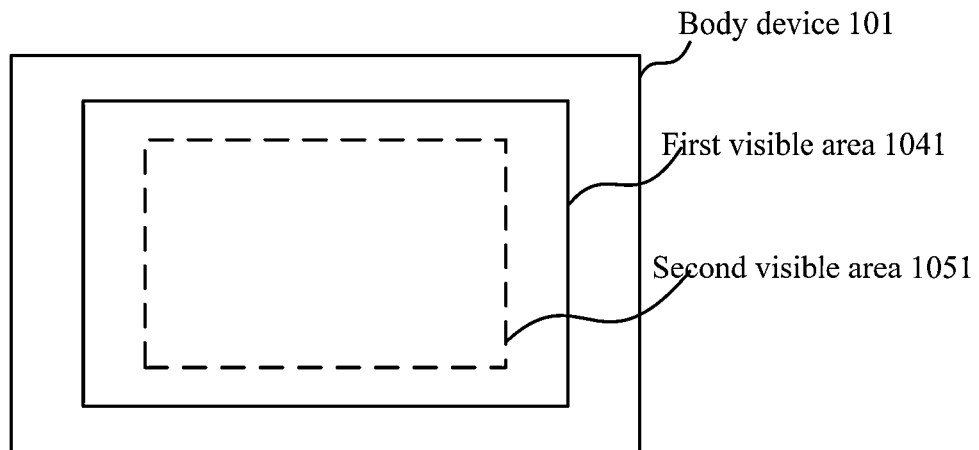
FIGS. 16A and 16B respectively are a plan view and a side view illustrating a first configuration example of a visible area of an electronic apparatus according to an embodiment of the present application.
Figure 16B:
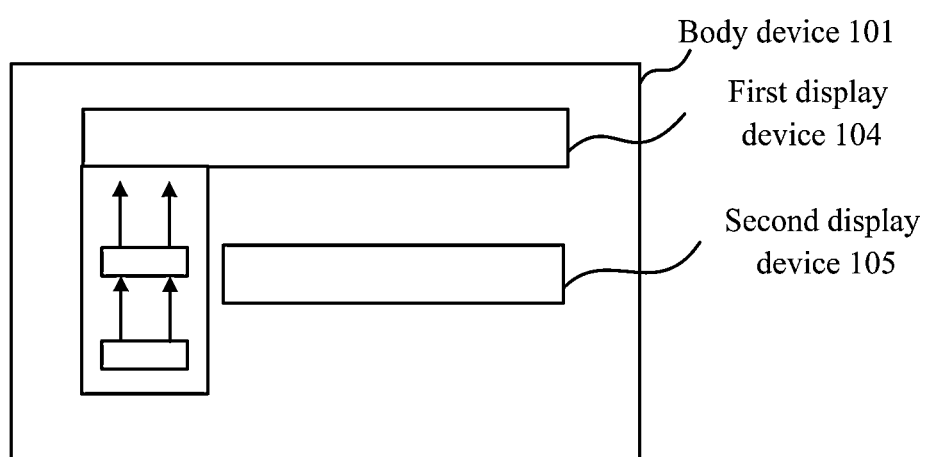

FIGS. 16A and 16B respectively are a plan view and a side view illustrating a first configuration example of a visible area of an electronic apparatus according to an embodiment of the present application.

As shown in FIG. 16A, the first visible area 1041 and the second visible area 1051 have a first configuration example of being provided overlapped on the body device 1011. The present application is not limited thereto, the first visible area 1041 and the second visible area 1051 may also be provided overlapped on the fixing device 102.

FIG. 16B further illustrates a side view of a first configuration example that the first visible area 1041 and the second visible area 1051 are provided overlapped. As shown in FIG. 16B, the first display device 104 configured with the first visible area 1041 and the second display device 105 configured with the second visible area 1051 are provided as shown in FIG. 17B, so that light transparency of at least the visible areas that are located at the outer side of the annular space or the approximate annular space within the first visible area 1041 and the second visible area 1051 satisfies a predetermined condition in the outward direction of the annular space or the approximate annular space. The predetermined condition may be that light transparency is greater than a predetermined value (such as 70%). In the example shown in FIGS. 16A and 16B, the first visible area 1041 is made at the outer side. The present application is not limited thereto, the second visible area 1051 may also be made at the outer side. By means of making the light transparency of the first visible area 1041 greater than or equal to a predetermined value, the first visible area 1041 will not affect the display function of the second visual display region 1051, thus achieving a more compact configuration.

Figure 17A:
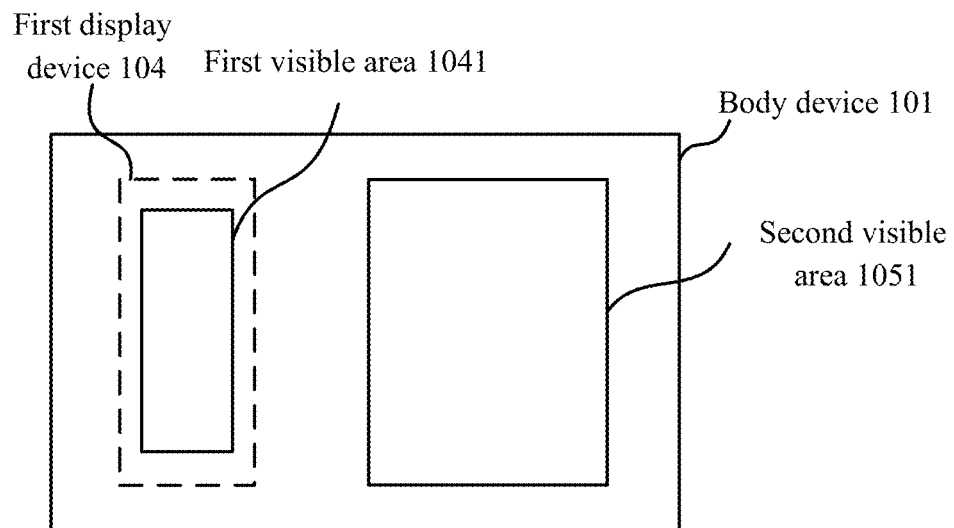
FIGS. 17A and 17B respectively are a plan view and a side view illustrating a second configuration example of a visible area of an electronic apparatus according to an embodiment of the present application.
Figure 17B:
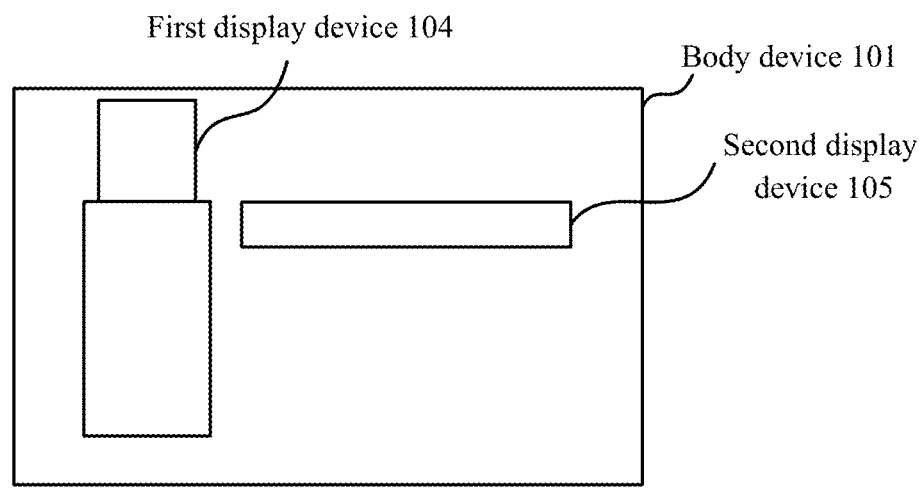

FIGS. 17A and 17B respectively are a plan view and a side view illustrating a second configuration example of a visible area of an electronic apparatus according to an embodiment of the present application.

As shown in FIG. 17A, the first visible area 1041 and the second visible area 1051 have a second configuration example of being provided adjacently on the body device 101 or the fixing device 102. As shown in FIGS. 17A and 17B, the first visible area 1041 and the second visible area 1051 are provided adjacently on the body device 101. The present application is not limited thereto, and the first visible area 1041 and the second visible area 1051 may be on the body device 101 and the fixing device 102, respectively, and a spacing between the first visible area 1041 and the second visible area 1051 is less than a threshold (e.g., 1 cm).

FIG. 17B further illustrates a side view of a second configuration example that the first visible area 1041 and the second visible area 1051 are provided overlapped. As shown in FIG. 17B, the first display device 104 configured with the first visible area 1041 and the second display device 105 configured with the second visible area 1051 are provided adjacently as shown therein, and the display directions of the first visible area 1041 and the second visible area 1051 both are in the outward direction of the annular space or the approximate annular space.

Figure 18A:
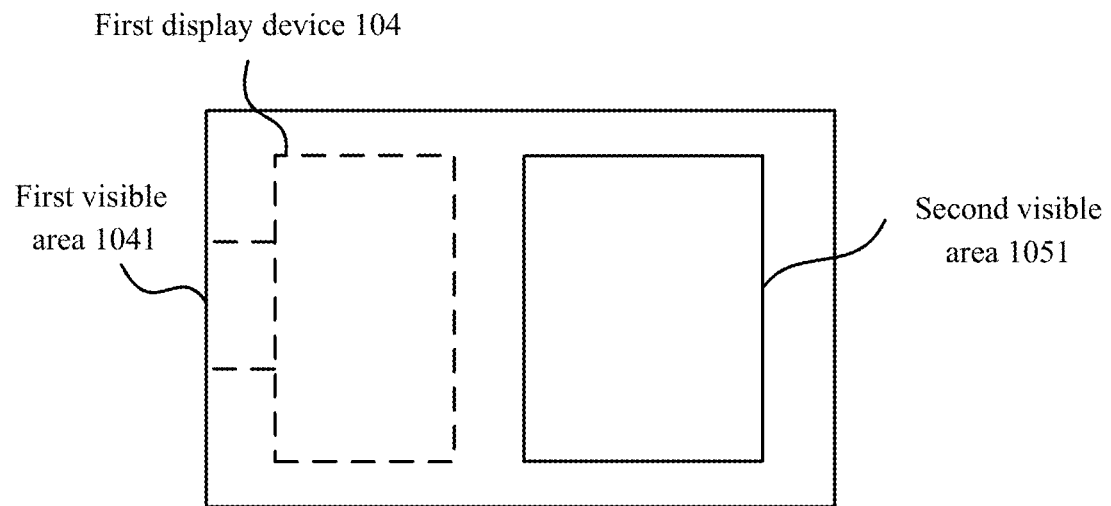
FIGS. 18A and 18B respectively are a plan view and a side view illustrating a third configuration example of a visible area of an electronic apparatus according to an embodiment of the present application.
Figure 18B:
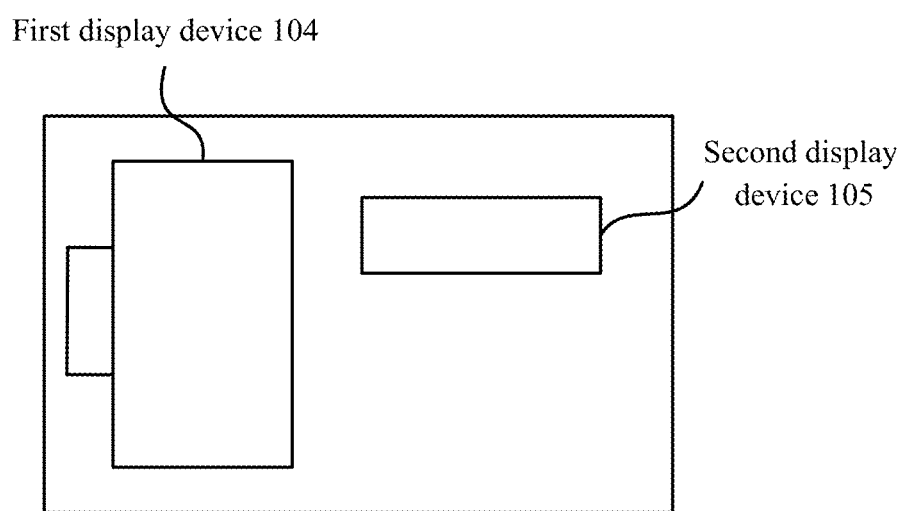

FIGS. 18A and 18B respectively are a plan view and a side view illustrating a third configuration example of a visible area of an electronic apparatus according to an embodiment of the present application.

As shown in FIG. 18A, the first visible area 1041 and the second visible area 1051 have a third configuration example of being provided adjacently on the body device 101 or the fixing device 102. Different than the second configuration example as shown in FIGS. 17A and 17B, as shown in FIG. 18B, the display direction of one of the first visible area 1041 and the second visible area 1051 is in the outward direction of the annular space or the approximate annular space, and the display direction of the other is in a direction vertical to the outward direction of the annular space or the approximate annular space.

In addition, a mutual switching between an overlapped state and a non-overlapped state of the first visible area 1041 and the second visible area 1051 will be described with reference to FIGS. 19A to 19D.

FIGS. 19A to 19D respectively are a plan view and a side view illustrating first to fourth examples of a mutual movement state of a visible area of an electronic apparatus according to an embodiment of the present application. For convenience of description, with the first visible area 1041 and the second visible area 1051 being both provided on the body device 101 as example. As will be readily appreciated, of course, the present application is not limited thereto, the first visible area 1041 and the second visible area 1051 may also be both provided on the fixing device 102. The body device 101 further includes a first subunit 801 and a second subunit 802, one of the first visible area 1041 and the second visible area 1051 is set on the first subunit 801, and the other is set on the second subunit 802, the first subunit 801 and the second subunit 802 are connected via a connecting unit, so that the first visible area 1041 and the second visible area 1051 switch between a first status and a third status of being provided non-overlapped.

Figure 19A:
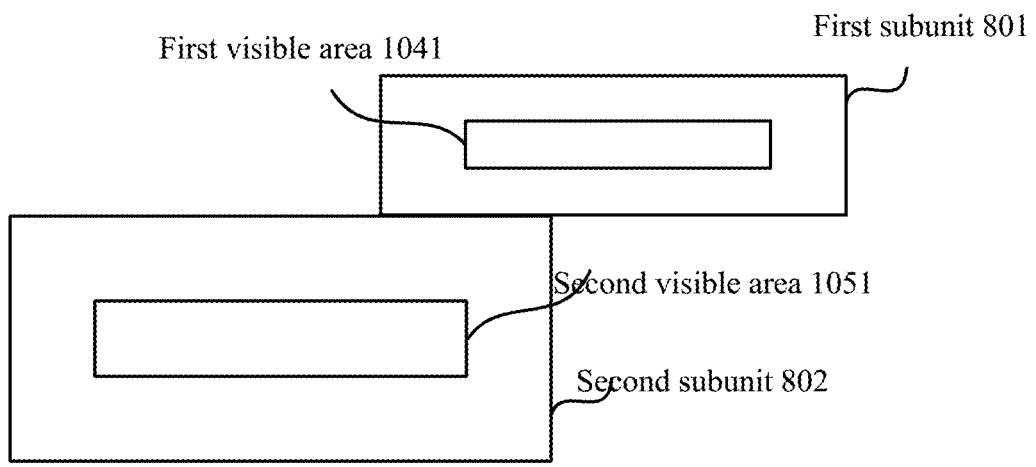
FIGS. 19A to 19D respectively are a plan view and a side view illustrating first to third examples of a mutual movement state of a visible area of an electronic apparatus according to an embodiment of the present application.

Specifically, as shown in FIG. 19A, the first subunit 801 and the second subunit 802 are connected via a slide track component (not shown) which serves as a connecting unit. The first visible area 1041 is set within the first subunit 801, the second visible area 1051 is set within the second subunit, when the first subunit 801 and the second subunit 802 slide apart relatively, the first visible area 1041 and the second visible area 1051 may be displayed simultaneously and may also be displayed separately. Further, it may be configured that a sliding of the first subunit 801 relative to the second subunit 802 generates a control signal that controls the second visible area 1051 to display or to close. Further, when the first subunit 801 slides apart relative to the second subunit 802 to the third state, light transparency of the first visible area 1041 satisfies a predetermined condition in the outward direction of the annular space or the approximate annular space. In this way, the user see his/her own skin through the electronic apparatus 100, like no first visible area 1041 is set.

Figure 19B:
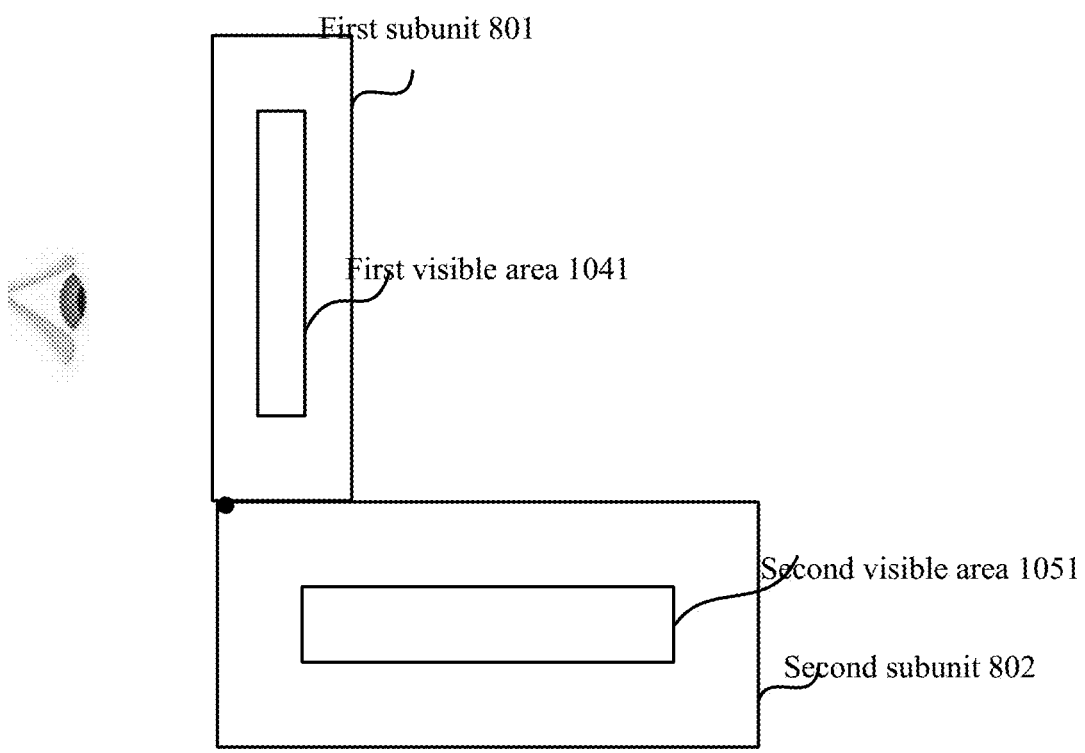
Figure 19C:
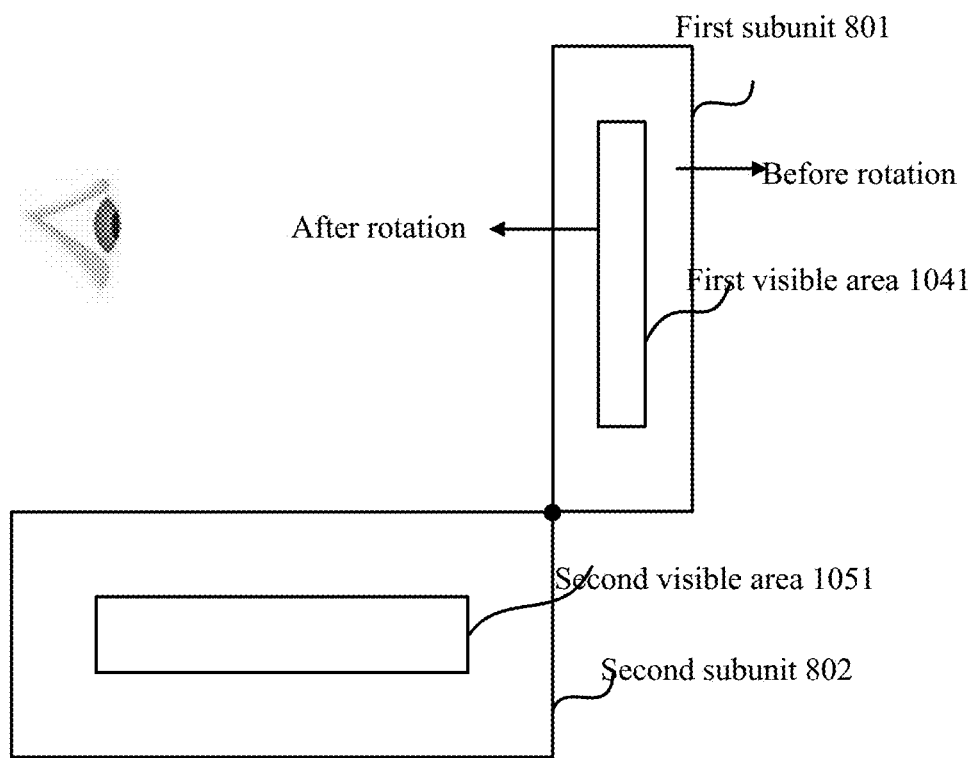
Figure 19D:
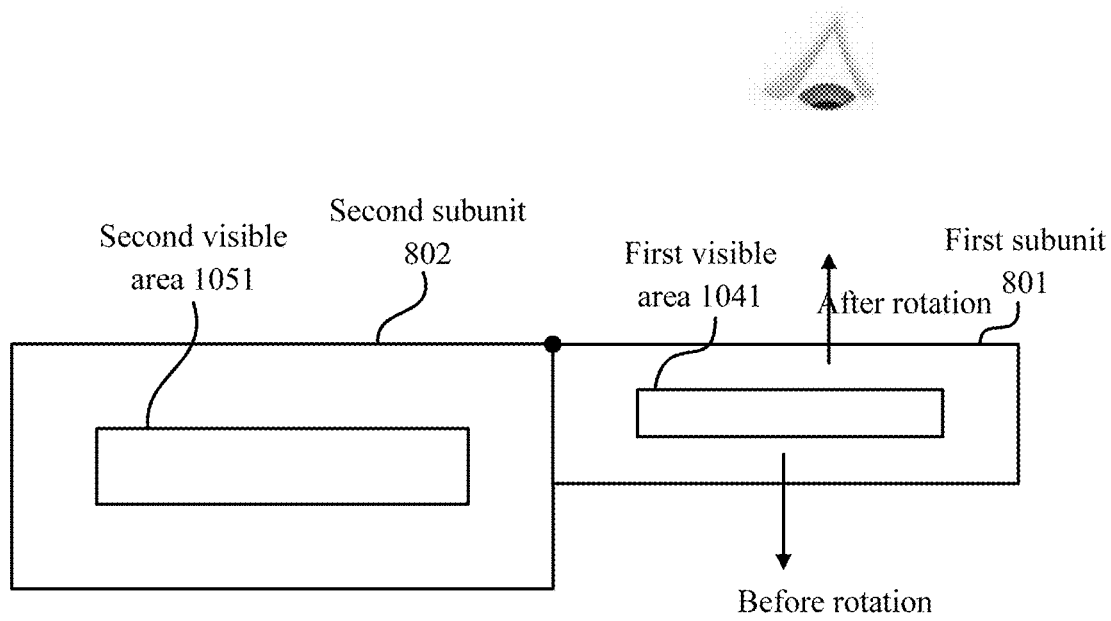

As shown in FIGS. 19B to 19D, the first subunit 801 and the second subunit 802 are connected via a rotating shaft component which serves as a connecting unit. The first visible area 1041 is set within the first subunit 801, the second visible area is set within the second subunit. When the first subunit 801 and the second subunit 802 are rotated relatively, the first visible area 1041 and the second visible area 1051 may be displayed simultaneously and may also be displayed separately. Further, it may be configured that a rotation of the first subunit 801 relative to the second subunit 802 generates a control signal that controls the second visible area to display or to close.

It should be noted that, as shown in FIGS. 19A and 19B, when the first subunit 801 is slide or rotated to switch to the third state, the display direction of the first visible area 1041 does not change, the user continues to view the display within the first visible area 1041 in the original display direction.

As shown in FIGS. 19C and 19D, when the first subunit 801 is rotated to switch from the first state to the third state, it needs to further configure the first subunit 801 so that the user views the display within the first visible area 1041 from the same viewing direction in the first state and the third state, thereby further enhancing user convenience. To this end, in an embodiment of the present application, the first subunit 801 may be configured as able to flip per se, the first subunit 180 flips 180 degrees while being rotated relative to the second subunit 802, so that the first visible area that turns to the rear again turns to the original display direction, that is, the display direction of the visible area 1041 remains unchanged after the rotation.

Figure 20:
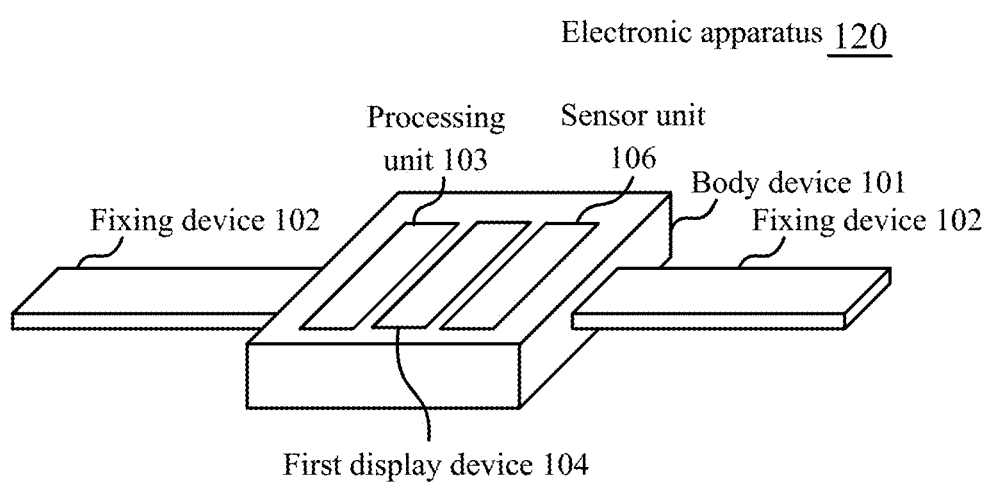
FIG. 20 is another schematic diagram illustrating an electronic apparatus according to an embodiment of the present application.

Further, in another embodiment of the present application, the first display device 104 is configured to perform bi-directional display through a light path selecting unit or an optical switching unit. Specifically, in the light path of the first display device 104 (e.g., in the waveguide unit), a beam splitter is provided so as to guide the light beam that forms the amplified virtual image to two display directions set opposite in the first display device 104, respectively. In addition, it is also possible to set an optical path switcher in the light path of the first display device 104, like a reflection mirror, so as to guide the light beam that forms the amplified virtual image to two display directions set opposite in the first display device 104, respectively. That is, when the first subunit 801 is rotated relative to the second subunit 802, in response to the rotation, the display direction of the first visible area of the first display device 104 performs a bidirectional switching through the beam splitter or the optical path switcher as mentioned above, so that the display direction of the first visible area 1041 remains unchanged with regard to the user after the rotation. FIG. 20 is another structural block diagram illustrating an electronic apparatus according to an embodiment of the present application. Compared with the electronic apparatus 100 according to the embodiment of the present application as described above with reference to FIGS. 12A to 12E, the electronic apparatus 120 according to an embodiment of the present application as shown in FIG. 20 further comprises a sensor unit 106. As shown in FIG. 20, the sensor unit 106 is provided on the body device 101. However, the sensor unit 106 may be also provided on the fixing device 102.

The sensor unit 106 is configured to generate a first control signal when sensing that a first predetermined condition is satisfied, the processing unit 103 controls ON/OFF of the first display device 104 based on the first control signal. In an embodiment of the present application, the sensor unit 106 is an acceleration sensor, the first predetermined condition is an acceleration component value in the gravity direction is greater than a predetermined value (i.e., putting down the electronic apparatus 100 from the use state that the user is viewing the first display device 104), and the processing unit 103 controls the first display device 104 to close based on the first control signal. As will be readily appreciated by those skilled in the art, the sensor unit 106 according to an embodiment of the present application is not limited to the acceleration sensor, it may include other sensor units that generate a control signal instead.

Figure 21A:
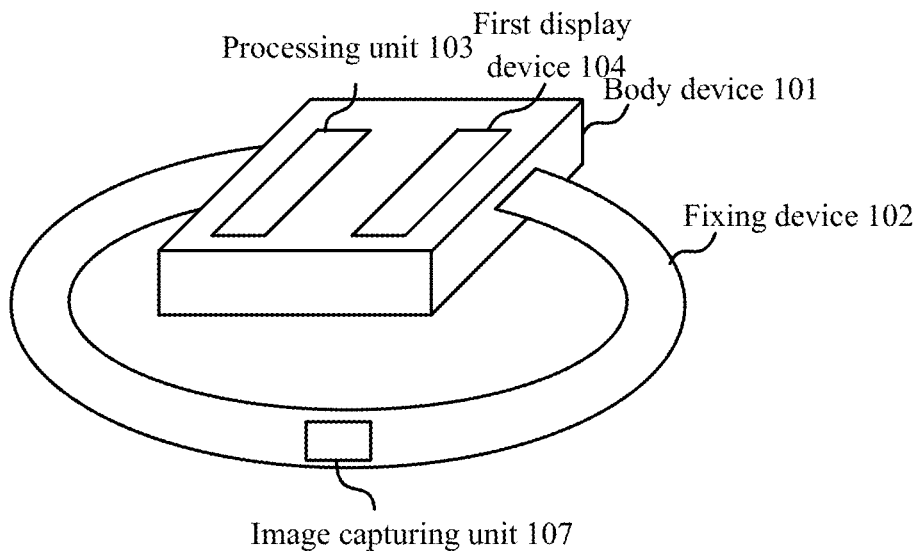
FIGS. 21A and 21B each are another schematic diagram illustrating an electronic apparatus according to an embodiment of the present application.
Figure 21B:
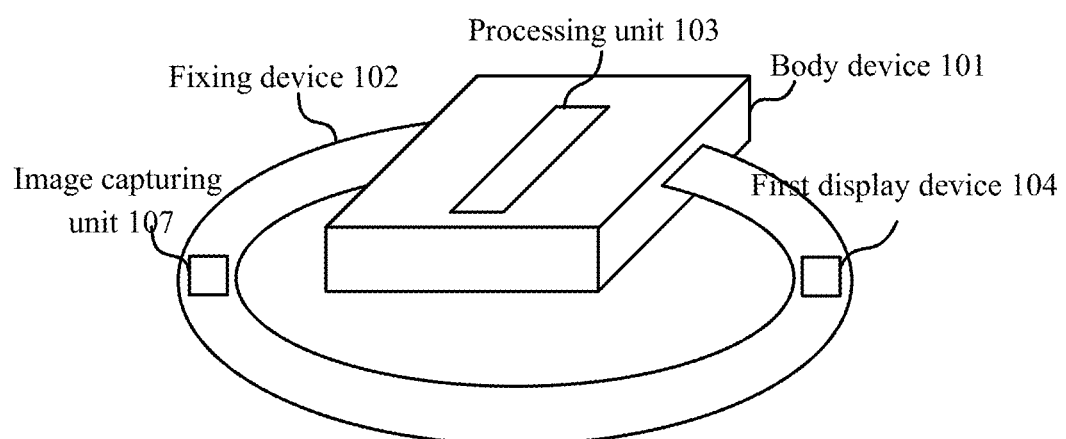

FIGS. 21A and 21B each are another structural block diagram illustrating an electronic apparatus according to an embodiment of the present application. Compared with the electronic apparatus 110 according to the embodiment of the present application as described above with reference to FIGS. 12A to 12E, the electronic apparatus 130 according to an embodiment of the present application as shown in FIGS. 21A and 21B further comprises an image capturing unit 107. The image capturing unit 107 may be provided on the body device 101 or the fixing device 102. Specifically, FIG. 21A shows the case that the first display device 104 is provided on the body device 101 and the image capturing unit 107 is provided on the fixing device 102. FIG. 21B shows the case that both the first display device 104 and the image capturing unit 107 are provided on the fixing device 102. No matter the case in FIG. 21A or FIG. 21B, an image capturing direction of the image capturing unit 107 and an image output direction of the first image display device 104 are opposite in the radial direction of the annular space or the approximate annular space. Thus, when the realistic image captured by the image capturing unit 107 is displayed on the first display device 104, since the capturing direction of the image capturing unit 107 is the same as the viewing direction of the user's eyes, so that the user can view the image that looks like transmitting through the electronic apparatus 140 via the first display device 104.

In an embodiment of the present application, the image capturing unit 107 is configured to capture user interaction to generate a first image capturing signal, the processing unit 103 converts the first image capturing signal into a second control signal to control the first display device 104 to display a second image.

In another embodiment of the present application, the image capturing unit 107 is configured to capture a first sub-image in the image capturing direction, the processing unit 103 generates a second sub-image. The second sub-image may be an identification image relative to the first sub-image obtained by analyzing the first sub-image, and may also be an identification image acquired based on for example a GPS sensor. Further, the second sub-image may also be an identification image acquired by searching from a server via the network based on the feature information obtained from the first sub-image. The first image is generated by superimposing the first sub-image and the second sub-image, so as to be displayed by the first display device 104.

Figure 22:
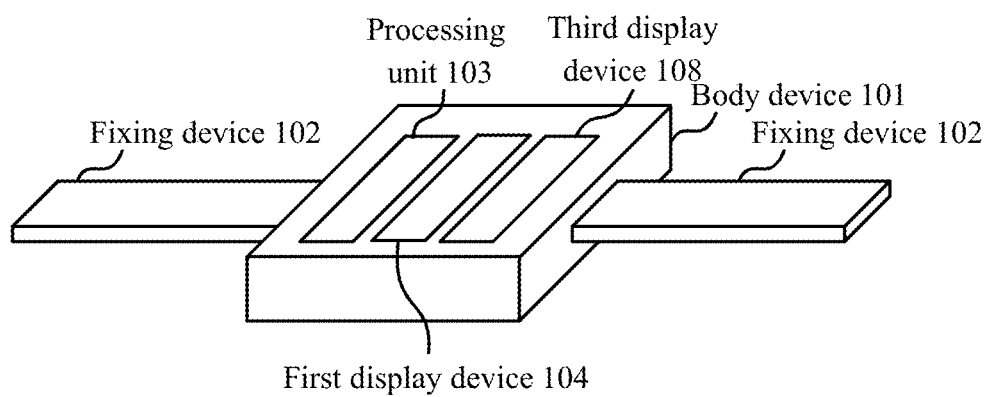
FIG. 22 is another schematic diagram illustrating an electronic apparatus according to an embodiment of the present application.

FIG. 22 is another structural block diagram illustrating an electronic apparatus according to an embodiment of the present application. Compared with the electronic apparatus 100 according to an embodiment of the present application as described above with reference to FIGS. 12A to 12E, the electronic apparatus 140 according to an embodiment of the present application further comprises a third display device 108. In the electronic apparatus 140 shown in FIG. 22, the third display device 108 and the first display device 104 are provided on the body device 101 together. As will be readily appreciated, the present application is not limited thereto, and the third display device 108 and the first display device 104 may also be provided on the fixing device 102 together.

The third display device 108 is a display device whose type is the same as that of the first display device 104. That is, the third display device is for forming an enlarged virtual image corresponding to a third image. The third image is associated with the first image, when the two eyes of the viewer accordingly view the first display device 104 and the third display device 108, respectively, the viewer can view and perceive a stereoscopic image corresponding to the first image and the third image. FIGS. 23A to 23D are schematic diagrams illustrating a first specific configuration of a fixing device of an electronic apparatus according to an embodiment of the present application.

Figure 23A:
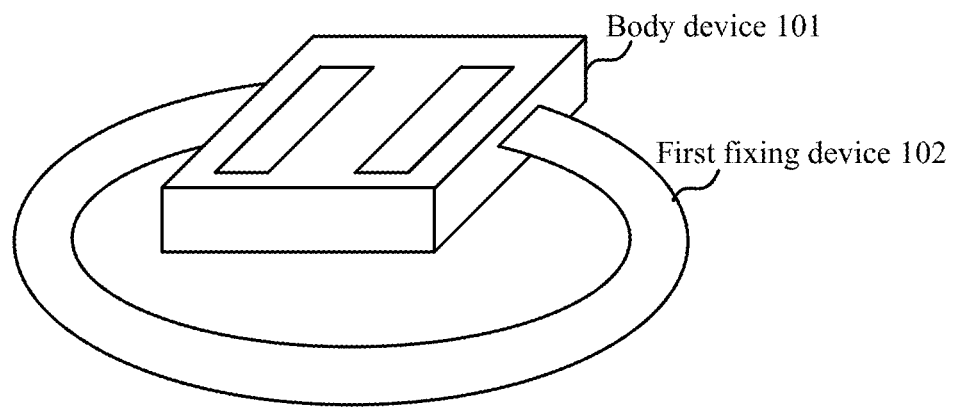
FIGS. 23A to 23D are schematic diagrams illustrating a first specific configuration of a fixing device of an electronic apparatus according to an embodiment of the present application.

As shown in FIG. 23A, the fixing device 102 includes at least a fixed state in which the fixing device 102 serves as at least a portion of an annular space or an approximate annular space that satisfies a first predetermined condition, the annular space or the approximate annular space surrounds periphery of a columnar body that satisfies a second predetermined condition.

Specifically, the fixing device 102 and the body device 101 form a closed annular space, wherein the fixing device 102 and the body device 101 constitute a portion of the annular space, respectively, or the fixing device 102 and the body device 101 form an approximate annular space with a small opening, wherein the fixing device 102 and the body device 101 constitute a portion of the approximate annular space, respectively. Alternatively, the annular space or the approximate annular space may also be formed by the fixing device 102 alone. In an embodiment of the present application, the body device 101 is a dial portion of a smart watch, and the fixing device 102 is a strap portion of the smart watch. The annular space or the approximate annular space formed by the fixing device 102 and the body device 101 surrounds the wrist of the user of the smart watch which serves as the columnar body, wherein in the case of forming an approximate annular space, a first predetermined condition that a gap of the approximate annular space in the annular circumference should be smaller than a diameter of the cylinder body that is to be surrounded should be satisfied. In addition, a diameter of the annular space or the approximate annular space should further satisfy a second predetermined condition of being greater than a diameter of the user's wrist and smaller than a diameter of the user's fist.

In order to realize the aim that the electronic apparatus 100 can provide different ways of wearing according to user needs and usage scenarios, a diameter of the annular space or the approximate annular space formed by the first fixing device 102 as shown in FIG. 23A may be changed. More preferably, a difference between a maximum and a minimum of the diameter is greater than a predetermined threshold. For example, the first fixing device 102 can fix the electronic apparatus 100 to the user's wrist, and when the user wishes to view a long time or without using the two hands, the fixing device 102 can fix the electronic apparatus 100 to the user's head. When fixed to the user's wrist, a diameter of the annular space or the approximate annular space should be about 10 cm, and when fixed to the user's head, a diameter of the annular space or the approximate annular space should be about 30 cm. The annular space or the approximate annular space formed by the first fixing device 102 has a maximum of about 30 cm and a minimum of about 10 cm. A difference between a maximum and a minimum of the diameter is greater than a predetermined threshold, e.g., the predetermined threshold may be 10 cm to the least, and preferably 20 cm; or alternatively, the predetermined threshold may be that the maximum is two times the minimum, and preferably three times. That is, the first fixing device 102 can provide the user with an adaptable adjustment range large enough to meet requirements in different usage scenarios.

Figure 23B:
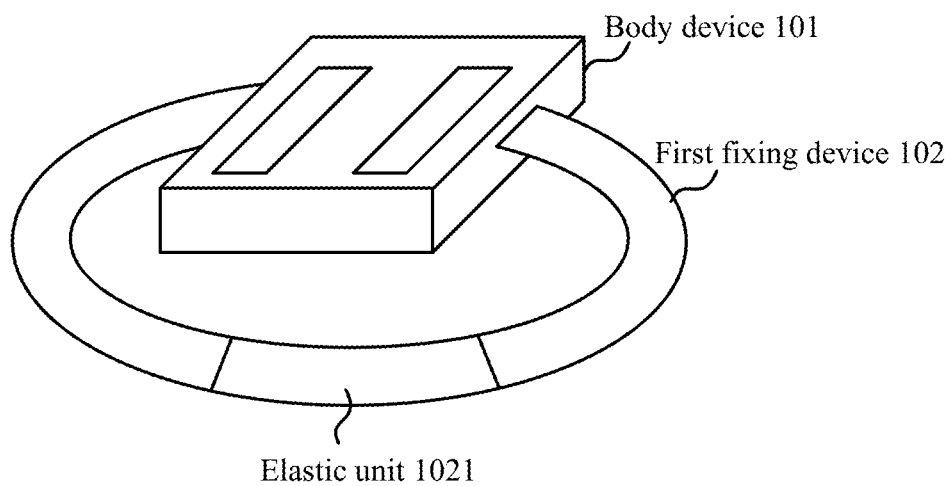
Figure 23C:
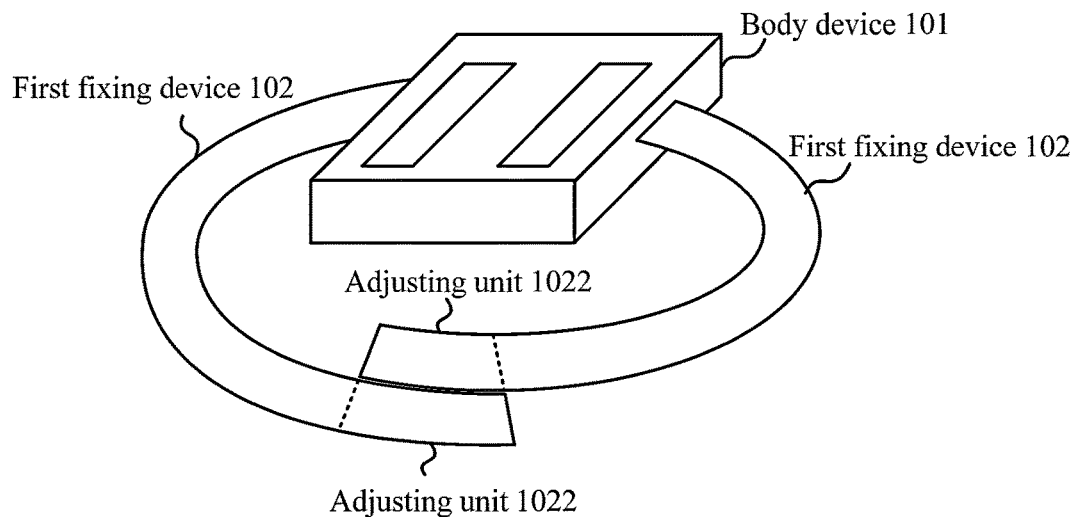
Figure 23D:
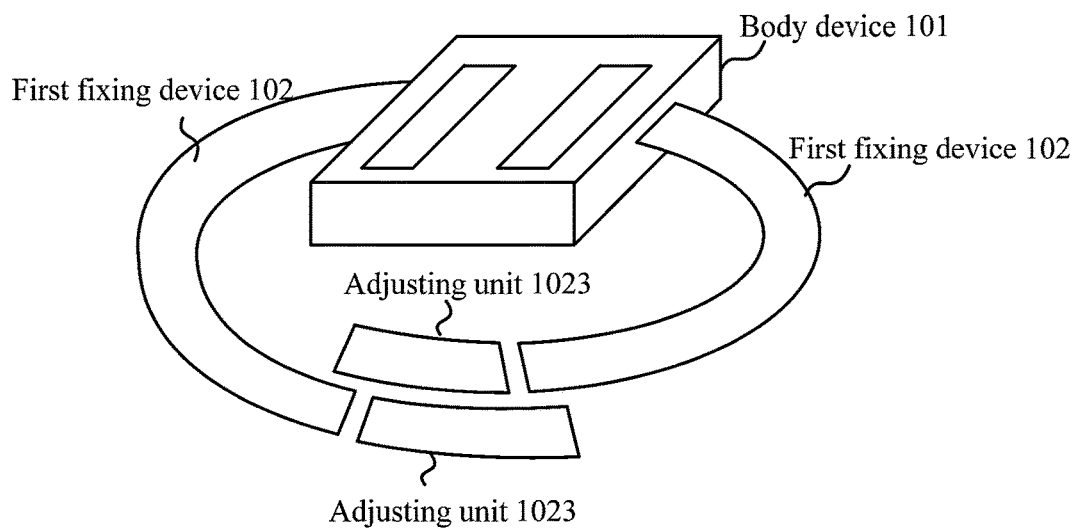

FIGS. 23B to 23D illustrate several ways to implement the first fixing device 102 with an adaptable large-enough adjustment range in FIG. 23A.

As shown in FIG. 23B, the first fixing device 102 may include at least one elastic unit 1021. The at least one elastic unit 1021 has a relaxed first state and a tensioned second state. When the elastic unit 1021 is completely relaxed, a diameter of the annular space or the approximate annular space is at the maximum; when the elastic unit 1021 is completely tensioned, a diameter of the annular space or the approximate annular space is at the minimum.

More specifically, the at least one elastic unit 1021 may refer to being composed by a plurality of discrete elastic subunits, or including only one complete elastic unit. In the case of including a plurality of discrete elastic subunits, it may further include a plurality of discrete elastic subunits that contain elastic space and connected by a rotating shaft, or a plurality of discrete elastic subunits that contain non-elastic space and connected flexibly.

As shown in FIGS. 23C and 23D, the first fixing device 102 may further include an adjusting unit 1022 or an adjusting unit 1023 for controlling a diameter of the annular space or the approximate annular space to vary between the maximum and the minimum. In the case shown in FIG. 23C, the adjusting unit 1022 is for example a component of a belt buckle, and it achieves control over the diameter of the annular space or the approximate annular space by controlling a length of overlapped portions in the first fixing device 102. In an embodiment of the present application, the adjusting unit 1022 is a rigid component having upper and lower portions that can overlap, when needs to be fixed to a columnar body with a large diameter, it is possible to reduce the length of the portions that can overlap to smaller (even until it is fully extended and has no overlapped portions), so as to form a larger diameter of the annular space or the approximate annular space; conversely, when needs to be fixed to a columnar body with a small diameter, it is possible to increase the upper and lower portions that can overlap to greater (even overlapped portions with three layers or more is formed), so as to form a smaller diameter of the annular space or the approximate annular space. After adaptive adjustment is made according to the columnar body to be fixed to, the adjusting unit 1022 is rigidly fixed.

In the case shown in FIG. 23D, the adjusting unit 1023 is for example an extending component, which achieves control over the diameter of the annular space or the approximate annular space by extending its own length as needed. In an embodiment of the present application, the adjusting unit 1023 may include a cavity in which a retractable component is accommodated, such as a roller wheel. The retractable component such as a roller wheel is stretched according to the diameter of the columnar body that needs to be fixed to, when needs to be fixed to a columnar body with a large diameter, it is possible to pull out the winding portion around the roller wheel, so as to form a large diameter of the annular space or the approximate annular space; conversely, when needs to be fixed to a columnar body with a smaller diameter, it is possible to wind more portions around the roller wheel, so as to form a smaller diameter of the annular space or the approximate annular space. In addition, as will be readily appreciated, the first fixing device according to an embodiment of the present application is not limited thereto, it may further include an external extending component, so as to connect or remove a proper external extending component according to the diameter of the columnar body that needs to be fixed to.

Figure 24A:
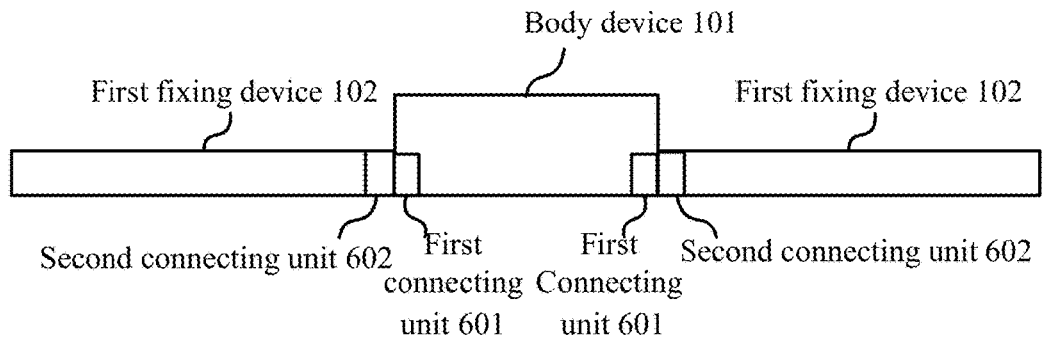
FIGS. 24A and 24B are schematic diagrams illustrating a second specific configuration of a fixing device of an electronic apparatus according to an embodiment of the present application.

In addition, the fixing device according to an embodiment of the present application is not limited to the manner of forming an annular space or an approximate annular space. In an embodiment of the present application, the body device 101 may be coupled with a different fixing device via a connecting unit, thus achieving different using states to be adaptive to different wearing manners. As shown in FIG. 24A, the body device 101 includes a first connecting unit 601, the first fixing device 102 includes a second connecting unit 602, the body device 101 and the first fixing device 102 are connected to each other via the coupling of the first connecting unit 601 and the second connecting unit 602. In an embodiment of the present application, the body device 101 is a dial portion of a smart watch, and the fixing device 102 is a strap portion of the smart watch, then the first connecting unit 601 and the second connecting means 602 are riveting components of the dial and the strap.

Figure 24B:
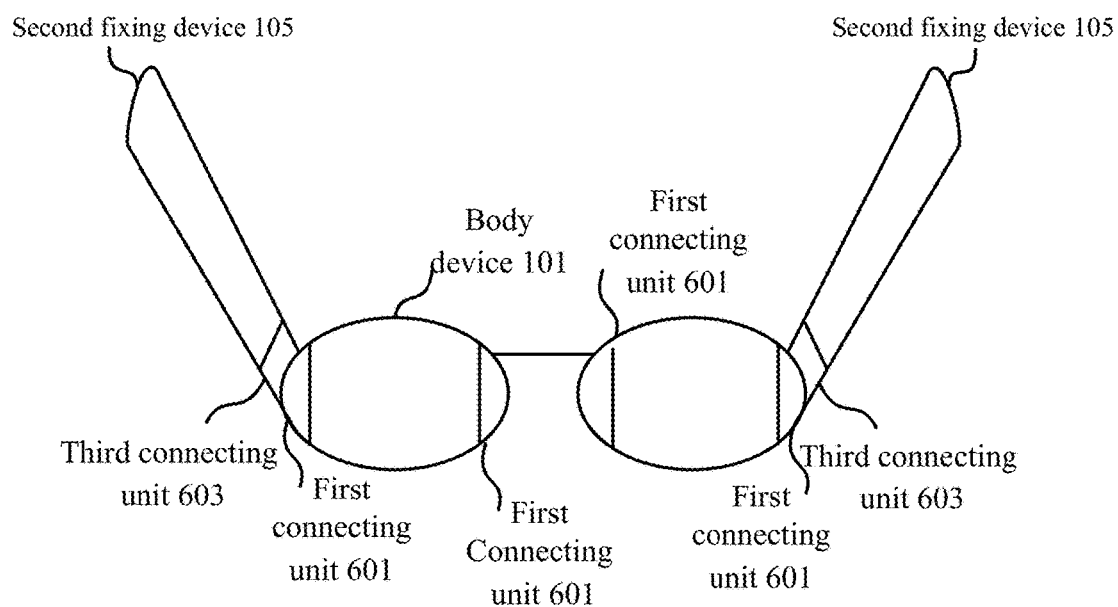

As shown in FIG. 24B, the electronic apparatus 100 may have a using state different than that shown in FIG. 24A. The body device 101 may be disconnected from the coupling with the first fixing device 102, and establish a coupling with a third connecting unit 603 in the second fixing device 105 via the first connecting unit 601, thus forming a second fixed state.

The body device 101 may include a first sub-device and a second sub-device that are connected via a connecting sub-device. The relative position of the first sub-device and the second sub-device may be changed. Specifically, in the example shown in FIGS. 24A and 24B, in an embodiment of the present application, the body device 101 may include a first sub-device and a second sub-device that can flap or slide apart horizontally, when the relative position of the first sub-device and the second sub-device changes (i.e., flap or slide apart horizontally), it switches from an overlapped state to a non-overlapped state. Both sides of each of the sub-devices are arranged with the first connecting unit 601. When needs to couple with the second fixing device 105, the body device 101 is outspreaded. For example, it is outspreaded into the glass lens shape as shown in FIG. 24B from the dial shape as shown in FIG. 24A. Accordingly, the second fixing device 105 may be composed of two to three sub-portions. For example, in the case where the body device 101 is outspreaded into the entire front portion of the smart glasses, the second fixing device 105 is two support components connected at both ends of the smart glasses (i.e., glass legs and nose holder). Further, in the case where the body device 101 is a part of the entire front portion of the smart glasses, the body device 101 may be fixed to the second fixing device 105 (not shown in particular) as one lens or a portion of one lens (e.g., embedded with edges being aligned totally or installed via a corresponding interface). In this case, the second fixing device 105 is three support components connected at both ends and in the middle of the smart glasses (i.e., glass legs and nose holder and glass frame). In the second fixed state shown in FIG. 24B, the second fixing device 102 is at least a portion of the approximate rectangular space that can surround periphery of an object that satisfies a third predetermined condition. Specifically, in the case where the object is a person's head, the third predetermined condition is projecting portions with numbers and positions corresponding to the second fixing device 105 (i.e., the person's ears and nose). That is, in the approximate rectangular space for surrounding the person's head, the second fixing device 105 has corresponding support components corresponding to the corresponding projecting portions to be fixed, e.g., the glass legs located at two ends of the space and the nose holder located in the middle of the space form an approximate rectangular space for surrounding the person's head.

As shown in FIGS. 24A and 24B, the electronic apparatus 100 may switch between the first fixed state and the second fixed state, so that in the case of wishing to view a long time or without using the two hands, the electronic apparatus 100 can change from the using manner of the smart watch to that of the smart glasses.

Figure 25:
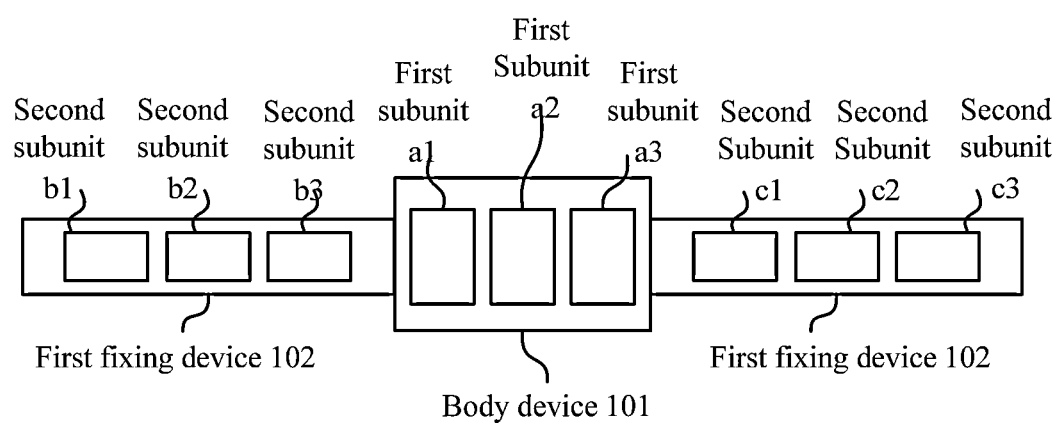
FIG. 25 is another schematic diagram illustrating an electronic apparatus according to an embodiment of the present application.

FIG. 25 is another schematic diagram illustrating an electronic apparatus according to an embodiment of the present application. As shown in FIG. 25, the electronic apparatus according to the embodiment of the present application also includes a body device 101 and a first fixing device 102. Specifically, the body device 101 includes at least one first subunit (first subunits a1 to a3), the first fixing device 102 includes at least one second subunit (second subunits b1 to c3), and the at least one first subunit and the at least one second subunit are data-connected or electrically connected. The plurality of first subunits in the body device 101 may be parallel to each other or connected in-serial. Similarly, the plurality of second subunits in the fixing device 102 may be parallel to each other or connected in-serial. Further, the at least one first subunit may be connected to the first fixing unit 102 via the body device 101, and then establish a data or electric connection with the at least one second subunit. Still further, the at least one subunit can establish a data or electric connection with the second subunit directly. The first subunit and the second subunit may be a display unit, a touch unit, a sensing unit, a circuit unit, a battery unit, a communication unit, a positioning unit, or an image capture unit and so on. The at least one second subunit is connected to the first fixing device 102 via a detachable connection interface. Specifically, the plurality of second subunits may be mounted within the cavity of the first fixing device 102 via a single interface. Alternatively, the plurality of second subunits may be mounted within the cavity of the first fixing device 102 via a plurality of interface corresponding thereto. Further, the second subunits may be installed via an external interface and fixed to the outer surface of the first fixing device 102.

Specifically, when the coupling between the body device 101 and the first fixing device 102 are disconnected, functions required by a current user are achieved by the respective subunits in the body device 101, so that in this case the electronic apparatus 100 is the lowest lightweight and have the lowest power consumption. That is, the first subunit included by the body device supports the operation of the electronic apparatus. For example, when the body device 101 includes the processing unit 103, the first display device 104, and a necessary power supply unit (not shown), the body device 101 can perform the display function of the electronic apparatus 100. Further, when equipped with a storage unit or a communication unit, the body device 101 can correspondingly perform a data storage function and a communication function, without being coupled to the first fixing device 102.

One or more of the at least one first subunit may be a type of subunit different than one or more of the at least one second subunit. Thus, function configurations adaptive to different usage scenarios are implemented by different combinations of the first subunit and the second subunit. Further, one or more of the at least one first subunit may be the same type of subunit as one or more of the at least one second subunit. Typically, performance of the first subunit is lower than performance of the second subunit of same type. For example, a battery capacity of the first subunit that serves a power supply unit is below a battery capacity of the second subunit that serves a power supply unit; a communication distance and a communication rate of the first subunit that serves a communication unit is below a communication distance and a communication rate of the second subunit that serves a communication unit. More specifically, a sum of the battery capacity of the second subunits that serve as power supply units in the first fixing device 102 is greater than a sum of the battery capacity of the first subunits that serve as power supply units. Alternatively, the battery capacity of each of the second subunits that serve as power supply units in the first fixing device 102 is greater than the battery capacity of each of the first subunits that serve as power supply units. In this way, the user can freely configure the various subunits as needed in practice. For example, in the case where the user is in a travel that requires a long endurance or the like, the second subunit whose battery capacity is higher is configured in the first fixing device 102. When in the case where the user is in a movement condition that requires lightweight, the unnecessary second subunit in the first fixing device 102 is removed, and power is provided only by the first subunit in the body device 101 alone which serves as the power supply unit. Further, when the body device 101 is configured with the first subunit having a short-range communication capability, the electronic apparatus 100 can establish a data connection such as Bluetooth-based with another independent electronic apparatus (such as a smart phone), to achieve function extension of this independence electronic apparatus, such as display extension (displaying navigation prompt information in a navigation scenario) or reminder extension (displaying caller identification information in the scenario of call-in). And when the first fixing device 102 is configured with the first subunit having a long-range communication capability (e.g., a mobile communication network data communication capability or a wireless local area network data communication capability), operation of the above first subunit may be suspended (the unit having the short-range communication capability), the electronic apparatus 100 becomes an independent electronic apparatus that can replace for example a smart phone, especially for the second subunit having the mobile communication network (such as 3G, 4G or the latter) data communication capability (of course, if coverage of the wireless local area network is broad enough, it is possible to achieve the same effect). In other words, the user can properly configure subunits with different communication capabilities according to usage scenarios and requirements. For example, in the case where the user is convenient to carry the portable smart phone, it is possible to use only the short-range communication unit in the body device 101, so that the electronic apparatus 100 in the embodiment of the present application is used as an accessory of the smart phone; when the user is inconvenient to carry the smart phone (e.g. during exercising), it is possible to use the long-range communication unit, the electronic apparatus 100 in the embodiment of the present application is used as a device having an independent communication function.

Further, the body device 101 and the first subunit and the second subunit in the first fixing device 102 may also be configured with gravity distribution of the electronic apparatus itself being considered, thereby achieving a uniform gravity distribution of the electronic apparatus, to provide more comfortable wearing experience. Specifically, the body device 101 and the cavity of the first fixing device 102 in which the first subunit and the second subunit are mounted or an external interface may be distributed symmetrically. For example, in the electronic apparatus 100 in the state of for example a smart watch or smart glasses, the first fixing device 102 provided on both sides of the body device 101 has the same number of cavities or external interfaces. In addition, the subunits installed into the cavity or external interface is configured in a uniform specification. For example, they have the same size, and have almost the same weight (a weight difference between respective subunits may be designed to be smaller than a predetermined weight threshold, e.g., 20 g).

As described above, the electronic apparatus 100 according to the embodiment of the present application may have a variety of using states, such as the smart watch state, the smart glasses state etc. In addition, the first display device 104 in the electronic apparatus 100 needs to be designed and provided on the body device 101 or the fixing device 102 according to different using states and scenarios, or even configured across both the body device 101 and the fixing device 102. In order to achieve such electronic apparatus 100 with a variety of modes and states, it is necessary to provide a more flexible design for the light path of the first display device 104.

Figure 26A:
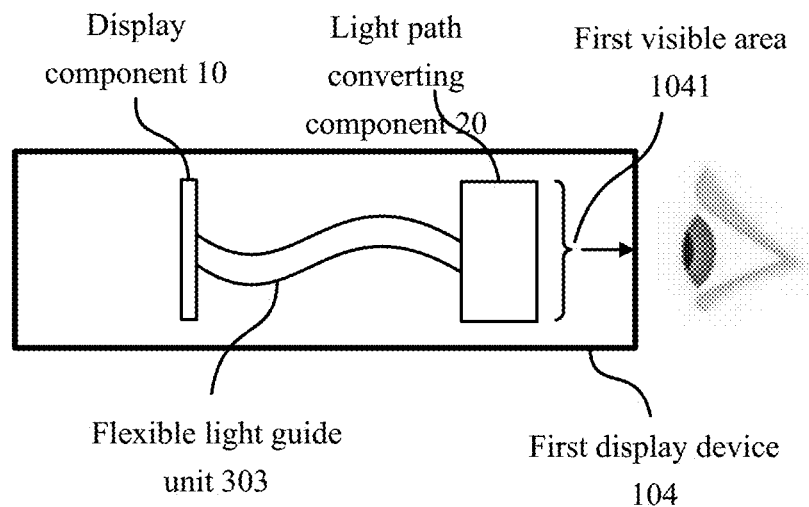
FIGS. 26A to 26C are schematic diagrams illustrating a display device in an electronic apparatus according to an embodiment of the present application.
Figure 26B:
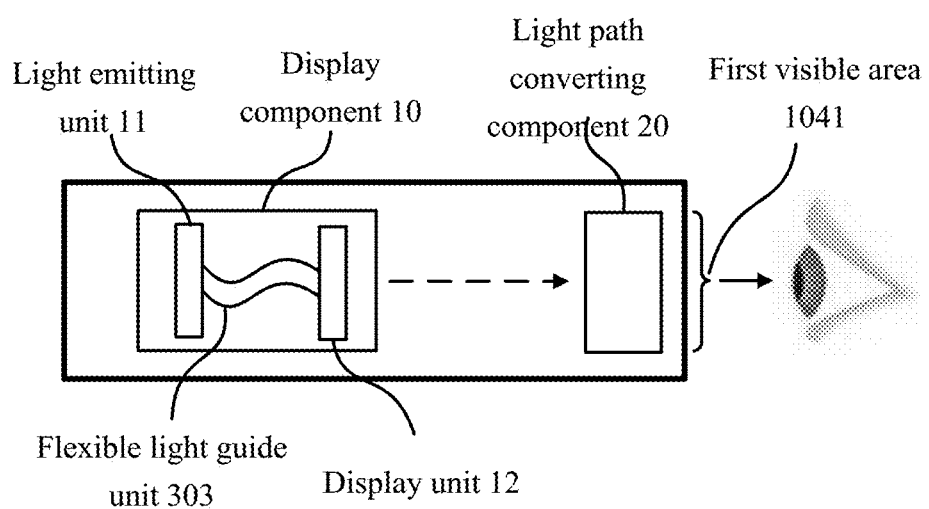
Figure 26C:
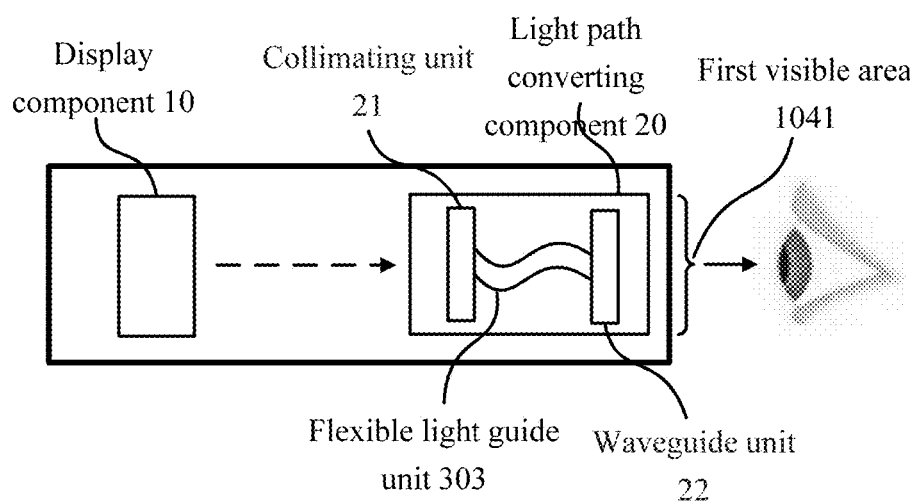

FIGS. 26A to 26C are schematic diagrams illustrating a display device in an electronic apparatus according to an embodiment of the present application. Compared with the display device described with reference to FIGS. 1-9, the first display device 104 further includes a flexible light guide unit 303.

Specifically, as shown in FIG. 26A, the flexible light guide unit 303 is provided between the display component 10 and the light path converting unit 20 and configured to guide the light corresponding to the first image to the light path converting unit 20. Further, as shown in FIGS. 26B and 26C, the flexible light guide unit 303 may also be provided in the display component 10 (FIG. 26B) or in the optical path converting component 20 (FIG. 26C).

In FIG. 26A, the flexible light guide unit 303 guides the light corresponding to the first image as emitted by the display component 10 to the light path converting component 20, so that the light path converting unit 20 forms an amplified virtual image corresponding to the first image. Therefore, because of the flexible property of the flexible light guide unit 303, it is adaptive to different design requirements, to provide bending or extending of the internal light path of the electronic apparatus 100. As such, the display component 10 and the light path converting component 20 of the first display device 104 may be provided separately. That is, the display component 10 may be provided in the body device 101, whereas the light path converting component 20 may be provided in the first fixing device 102, and vice versa.

In FIG. 26B, the display component 10 further includes a light emitting unit 11 and a display unit 12 (as described above with reference to FIG. 5). The flexible light guide unit 300 is provided between the light emitting unit 11 and the display unit 12 for guiding the light emitted by the light emitting unit 11 to the display unit 12. As such, the light emitting unit 11 and the display unit 12 may be provided separately. That is, the light emitting unit 11 may be provided in the body device 101, whereas the display unit 12 may be provided in the first fixing device 102, and vice versa.

In FIG. 26C, the light path converting unit 20 includes a collimating unit 21 and a waveguide unit 22 (as described above with reference to FIGS. 10A and 10B), the flexible light guide unit 303 is provided between the collimating unit 21 and the waveguide unit 22, for guiding the light corresponding to the first image to the waveguide unit 22. As such, the collimating unit 21 and the waveguide unit 22 may be provided separately. That is, the collimating unit 21 may be provided in the body device 101, whereas the waveguide unit 22 may be provided in the first fixing device 102, and vice versa.

As described above, the flexible light guide unit 303 provided in the display component 10 is for guiding the light before forming the first image, the flexible light guide unit 303 provided between the display component 10 and the light path converting unit 20 is for guiding the light corresponding to the first image after forming the first image.

The first display device 104 in the electronic apparatus according to the embodiment of the present application achieves bending or extending of the internal light path by configuring the flexible light guide unit 303 therein, so that the first display device 104 may be configured across both the body device 101 and the fixing device 102. That is, the display component 10 and the light path converting component 20 in the first display device 104 are provided on the body device 101 and the fixing device 102, respectively, or, the light emitting unit 11 and the display unit 12 in the display component 10 are provided on the body device 101 and the fixing device 102, respectively. As such, since the flexible light guide unit 303 is almost unlimited by the external physical shape, the first display device 104 in the electronic apparatus according to the embodiment of the present application can configure its internal light path flexibly, in order to meet the different using states and requirements in practice.

In the following, the using state of the electronic apparatus according to an embodiment of the present application will be further described with reference to FIGS. 27A and 27B.

Figure 27A:
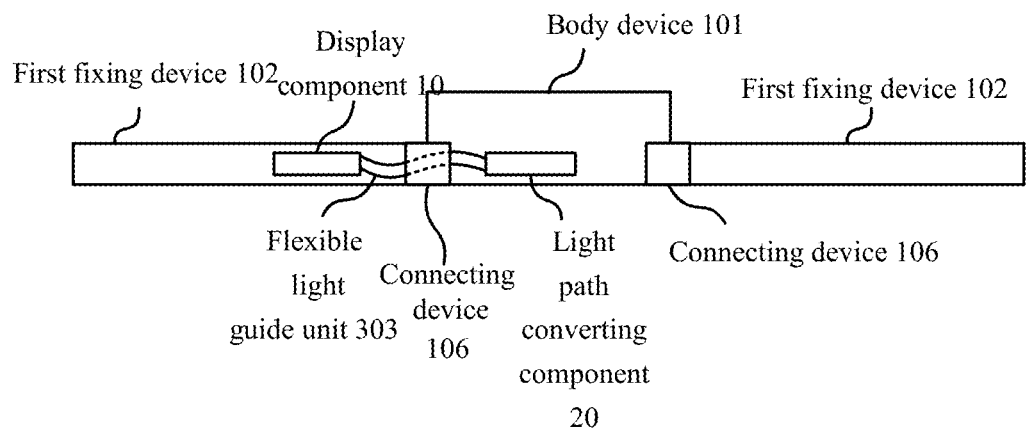
FIGS. 27A and 27B are schematic diagrams illustrating a using state of an electronic apparatus according to an embodiment of the present application.
Figure 27B:
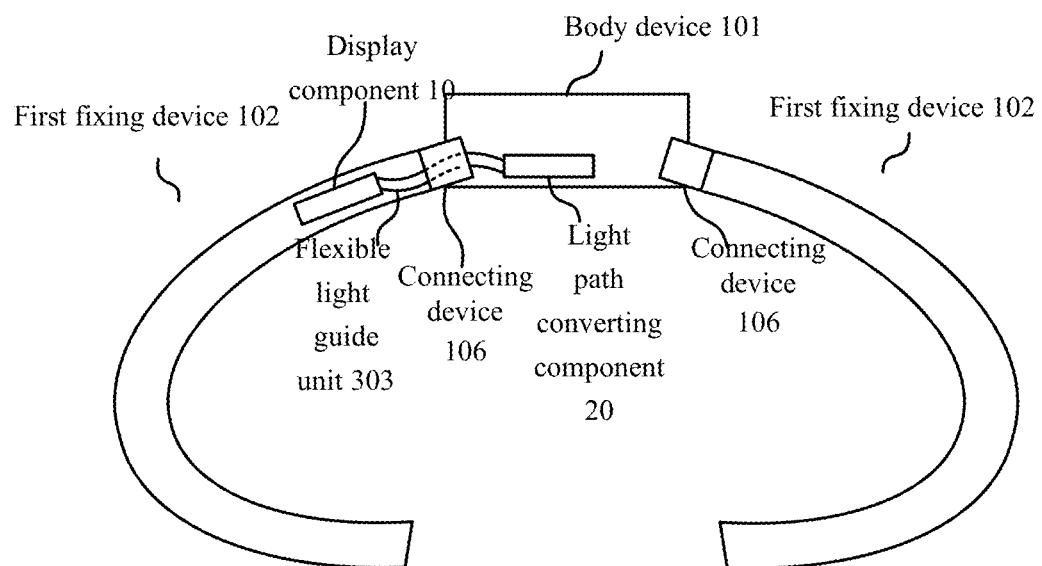

FIGS. 27A and 27B are schematic diagrams illustrating a using state of an electronic apparatus according to an embodiment of the present application. As shown in FIGS. 27A and 27B, in the electronic apparatus according to an embodiment of the present application, the first display device 104 is configured across the body device 101 and the first fixing device 102. Specifically, the display component 10 in the first display device 104 is provided in the first fixing device 102, and the light path converting unit 20 is provided in the body device 101. As described above, the electronic apparatus according to an embodiment of the present application is not limited thereto, it is also possible that the display component 10 is provided in the body device 101 and the light path converting component 20 is provided in the first fixing device 102. Alternatively, it is also possible that the display component 10 or the light path converting component 20 per se are provided across the body device 101 and the first fixing device 102. Here, descriptions are provided with the case illustrated by FIGS. 27A and 27B as example.

In addition to the body device 101 and the first fixing device 102, the electronic apparatus shown in FIGS. 27A and 27B further comprises a connecting device 106 through which the body device 101 and the fixing device 102 are connected. Further, the body device 101 and the fixing device 102 can move relatively. Specifically, in a first using state as shown in FIG. 27A (non-wearing state), the body device 101 and the fixing device 102 connected through the connecting device 106 are almost on the same plane, in a second using state as shown in FIG. 27B (wearing state), the body device 101 and the fixing device 102 connected through the connecting device 106 move relatively, are in the position and angle different than the first using state.

Further, in the electronic apparatus shown in FIGS. 27A and 27B, the flexible light guide unit 303 is provided corresponding to the connecting device 106, so that when the body device 101 and the fixing device 102 are in a different relative position, the flexible light guide unit 303 is used for guiding delivery of the light. Specifically, in the case shown in FIGS. 27A and 27B, the flexible light guide unit 303 is provided corresponding to the connecting device 106 means that the flexible light guide unit 303 travels through the internal of the connecting device 106. Of course, the electronic apparatus according to an embodiment of the present application is not limited thereto, the flexible light guide unit 303 may be provided independent of the connecting device 106 but bonded to each other, and thus the two are encapsulated by another encapsulation.

In the conventional wearable electronic apparatus equipped with no flexible light guide unit, no matter the body device and the fixing device of the electronic apparatus are connected via the connecting device or connected directly, when needs to configure a display unit like the first display device 104, display-related components in the display device must be configured on a rigid surface or an extending surface of the body device or the fixing device, which results in that a physical size of the display-related components that is accommodated is very limited, or causes the plane for accommodating the display-related components to enlarge unnecessarily, thereby the display effect to the user is limited or the wearing experience to the user to restricted.

The electronic apparatus according to an embodiment of the present application are configured with the flexible light guide unit 303, thereby it solves the above technical problem. As will be readily appreciated, the electronic apparatus according to an embodiment of the present application is not limited to the examples described with reference to FIGS. 27A and 27B. For example, the electronic apparatus according to another embodiment of the present application is allowed to have no the connecting device 106 configured, instead, the body device 101 and the fixing device 102 are connected directly. Regardless of whether the connecting device 106 is configured, since the first display device 104 is configured with the flexible light guide unit 303, so that the respective components in the first display device 104 is configured in the body device 101 or in the fixing device 102, or configured across the body device 101 and the fixing device 102, as needed by design. The flexible property of the flexible light guide unit 303 enables to be adaptive to the external shape of different electronic apparatus used, without restricting the display-related components within a single display rigid plane.

In the above, the display device and the electronic apparatus using the display device according to the embodiments are described with reference to FIGS. 1 to 27B. The display device and the electronic apparatus using the display device according to the embodiments of the present application can provide image or video display with larger size and higher resolution without being restricted by size of the wearable electronic apparatus itself, like a smart watch, thereby enhance associated user experience. In addition, the size and weight of the display device are further reduced, so as to provide more comfortable wearing experience to the user. Further, it provides a more flexible component configuration manner, it is possible to adapt to specific designs aiming at different using states. Still further, it can adaptively provide a variety of wearing manners and a free combination of and switching between a plurality of functional modules based on user's different usage scenarios, needs, and the contents to be displayed. The electronic apparatus and the display method according to the embodiments of the present application greatly enhance the user experience with regard to the wearable electronic apparatus.

It should be noted that, in the specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processings do not only comprise processings executed chronologically in the order mentioned here, but also comprise processings executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limitation of the present disclosure.

The invention claimed is:

1. A display device, comprising:
a display component configured to output initial light corresponding to a first image; and
a light path converting component configured to receive the initial light corresponding to the first image from the display component and to perform light path conversion on the initial light corresponding to the first image to form a virtual image corresponding to the first image, wherein the virtual image corresponding to the first image is perceived at a particular position and a size of the virtual image perceived being greater than a display size of the display component,
wherein the light path converting component comprises a visible area, the particular position and the display component are located separately at two sides of a plane on which the visible area is located.

2. The display device according to claim 1, wherein the light path converting component unit comprises a collimating unit and a waveguide unit,
the collimating unit is configured to collimate the initial light corresponding to the first image from the display component into collimated light corresponding to the first image and to lead the same into the waveguide unit;
the waveguide unit guides the collimated light from the collimating unit to the particular position,
wherein the collimated light corresponding to the first image forms the virtual image corresponding to the first image.

3. The display device according to claim 2, wherein a reflection subunit is provided within the waveguide unit and used for reflecting the collimated light corresponding to the first image from the collimating unit towards the particular position.

4. The display device according to claim 2, wherein the collimating unit comprises at least three optical surfaces, at least one among the at least three optical surfaces is a curved surface, the at least one curved surface satisfies a specific curved surface equation so that the initial light incident on the at least one curved surface and corresponding to the first image is converted into light for forming the amplified virtual image corresponding to the first image.

5. The display device according to claim 4, wherein the at least three optical surfaces comprise a first optical surface, a second optical surface, and a third optical surface, the initial light corresponding to the first image from the display component transmits through the first optical surface is reflected by the second optical surface and the third optical surface successively, and transmits through the second optical surface and enters the waveguide unit in order.

6. The display device according to claim 1, wherein light that forms the first image in the display component is on a first plane, light that forms the virtual image corresponding to the first image and exits from the light path converting component is on a second plane such that there is a first angle between the first plane and the second plane, so that a first size of the display component in a direction vertical to the first plane is smaller than a second size of the display component in a direction parallel to the first plane.

7. The display device according to claim 1, wherein the display component comprises:
a light emitting unit configured to emit backlight towards the first direction; and
a display unit provided within an irradiation area of the backlight, and configured to generate the initial light corresponding to the first image based on the first image,
wherein the light emitting unit comprises a light source subunit and a light guide subunit, the light source subunit is configured to emit light towards a second direction, the light guide subunit is provided within an irradiation area of the light, the light transmits through the light guide subunit to form the backlight; wherein the first direction and the second direction are different, so that a size of the display component in the first direction is smaller than a size of the display component in the first direction in the case that the first direction and the second direction are the same.

8. The display device according to claim 1, wherein the display component comprises:
a display unit configured to generate a display signal corresponding to the first image based on the first image;
a light emitting unit configured to generate the initial light corresponding to the first image based on the display signal; and
a beam splitting unit configured to guide the initial light corresponding to the first image from the display unit to the light path converting component,
wherein the display unit and the light emitting unit are integrally provided on one side of the beam splitting unit, so that a size of the display device in the direction of generating the initial light is smaller than a size of display device in the direction of generating the initial light in the case that the display unit and the light emitting unit are integrally provided on both sides of the beam splitting unit.

9. The display device according to claim 1, wherein the display unit comprises:
a micro-display subunit configured with an array of a plurality of pixel cells, each pixel cell being used for generating the initial light corresponding to the first image;
a circuit board subunit configured to provide a control signal based on the first image to control the pixel cells in the micro-display subunit to generate the initial light corresponding to the first image; and
a substrate subunit configured to arrange the micro-display subunit and the circuit board subunit thereon,
wherein the substrate subunit is made from non-metallic material that satisfies a predetermined intension, and thickness of the substrate subunit is less than that of the substrate subunit made from metallic material that satisfies a predetermined intension.

10. An electronic apparatus, comprising:
a body device that comprises a processing unit configured to generate a first image to be displayed and execute display control;
a fixing device connected with the body device and configured to fix a position relationship relative to a user of the electronic apparatus; and
a display device provided within the body device and/or the fixing device, wherein the display device comprises:
a display component configured to output initial light corresponding to the first image; and
a light path converting component configured to receive the initial light corresponding to the first image from the display component, and perform light path conversion on the initial light corresponding to the first image to form a virtual image corresponding to the first image, wherein the virtual image corresponding to the first image is perceived at a particular position and a size of the virtual image perceived is greater than a display size of the display component,
wherein the light path converting component comprises a visible area, the particular position and the display component are located separately at two sides of a plane on which the visible area is located.

11. The electronic apparatus according to claim 10, wherein the light path converting component unit comprises a collimating unit and a waveguide unit,
the collimating unit is configured to collimate the initial light corresponding to the first image from the display component into collimated light corresponding to the first image, and lead the same into the waveguide unit;
the waveguide unit guides the collimated light from the collimating unit to the particular position,
wherein the collimated light corresponding to the first image is for forming the virtual image corresponding to the first image, a reflection subunit is provided within the waveguide unit, and used for reflecting the collimated light corresponding to the first image from the collimating unit towards the particular position.

12. The electronic apparatus according to claim 11, wherein the collimating unit comprises at least three optical surfaces, at least one among the at least three optical surfaces is a curved surface,
the at least three optical surfaces comprise a first optical surface, a second optical surface, and a third optical surface, the initial light corresponding to the first image from the display component transmits through the first optical surface, is reflected by the second optical surface and the third optical surface successively, and transmits through the second optical surface and enters the wave guide unit in order.

13. The electronic apparatus according to claim 10, wherein light transparency of the light guide unit in the direction of guiding the collimated light corresponding to the first image to the particular position to exit satisfies a predetermined condition.

14. The electronic apparatus according to claim 10, further comprising a second display device configured to output a second image, and the first visible area and a second visible area of the second display device are set on the body device, or the first visible area and the second visible area are set on the fixing device, or one of the first visible area and the second visible area is set on the body device and the other is set on the fixing device, wherein the first display device and the second display device are display devices that follow different display principles.

15. The electronic apparatus according to claim 14, wherein the first visible area and the second visible area have a first state of being provided overlapped on the fixing device or the body device, and light transparency of a visible portion that at least resides more closer to the particular position among the first visible area and the second visible area satisfies a predetermined condition in the direction of exiting towards to the particular position, or the first visible area and the second visible area have a second state of provided adjacently on the fixing device or the body device.

16. The electronic apparatus according to claim 14, further comprising a sensor unit provided on the body device or the fixing device and configured to generate a first control signal when sensing that a first predetermined condition is satisfied, the processing unit controls ON/OFF of the first display device based on the first control signal.

17. The electronic apparatus according to claim 16, wherein the sensor unit generates a second control signal when sensing that a second predetermined condition is satisfied, the processing unit controls switching display of the first display device and the second display device based on the second control signal.

\* \* \* \* \*